United States Patent
Ahal et al.

(10) Patent No.: US 7,849,361 B2
(45) Date of Patent: Dec. 7, 2010

(54) METHODS AND APPARATUS FOR MULTIPLE POINT IN TIME DATA ACCESS

(75) Inventors: Shlomo Ahal, Tel-Aviv (IL); Oded Kedem, Tel-Aviv (IL); Assaf Natanzon, Ramat-Gan (IL)

(73) Assignee: EMC Corporation, Hopkinton, MA (US)

(*) Notice: Subject to any disclaimer, the term of this patent is extended or adjusted under 35 U.S.C. 154(b) by 498 days.

(21) Appl. No.: 11/609,561

(22) Filed: Dec. 12, 2006

(65) Prior Publication Data

US 2007/0266053 A1 Nov. 15, 2007

Related U.S. Application Data

(60) Provisional application No. 60/753,263, filed on Dec. 22, 2005.

(51) Int. Cl.
 *G06F 11/00* (2006.01)
(52) U.S. Cl. ......................................................... 714/15
(58) Field of Classification Search ................. 714/5–8, 714/15
 See application file for complete search history.

(56) References Cited

U.S. PATENT DOCUMENTS

| | | |
|---|---|---|
| 5,170,480 A | 12/1992 | Mohan et al. |
| 5,388,254 A | 2/1995 | Betz et al. |
| 5,499,367 A | 3/1996 | Bamford et al. |
| 5,864,837 A | 1/1999 | Maimone |
| 5,879,459 A | 3/1999 | Gadgil et al. |
| 5,990,899 A | 11/1999 | Whitten |
| 6,042,652 A | 3/2000 | Hyun et al. |
| 6,065,018 A | 5/2000 | Beier et al. |
| 6,143,659 A | 11/2000 | Leem |

(Continued)

FOREIGN PATENT DOCUMENTS

EP 1154356 11/2001

(Continued)

OTHER PUBLICATIONS

Michael Lewin, et al. "Methods and Apparatus for Point in Time Data Access and Recovery", U.S. Appl. No. 11/609,560, filed Dec. 12, 2006.

(Continued)

*Primary Examiner*—Bryce P Bonzo
(74) *Attorney, Agent, or Firm*—Daly, Crowley, Mofford & Durkee, LLP

(57) ABSTRACT

Method and apparatus for data access, including for a host device designated as Device A within a host computer, the host device corresponding to a first logical storage unit designated as LUN A, where LUN A is configured to access data directly from a physical storage system, assigning a second logical storage unit, designated as LUN X, wherein LUN X is configured to access the storage system indirectly via a data protection computer, providing the data protection computer access to a data structure that is able to recover data that was stored in the storage system at an earlier point in time, T1, and in response to a request from the host computer for data that was stored in the storage system at time T1, switching Device A to get its data from LUN X instead of from LUN A. A data access system and a computer-readable storage medium are also described and claimed.

15 Claims, 17 Drawing Sheets

U.S. PATENT DOCUMENTS

| | | | |
|---|---|---|---|
| 6,148,340 | A | 11/2000 | Bittinger et al. |
| 6,174,377 | B1 | 1/2001 | Doering et al. |
| 6,174,809 | B1 | 1/2001 | Kang et al. |
| 6,203,613 | B1 | 3/2001 | Gates et al. |
| 6,260,125 | B1 | 7/2001 | McDowell |
| 6,270,572 | B1 | 8/2001 | Kim et al. |
| 6,272,534 | B1 | 8/2001 | Guha |
| 6,287,965 | B1 | 9/2001 | Kang et al. |
| 6,467,023 | B1 * | 10/2002 | DeKoning et al. ........... 711/114 |
| 6,574,657 | B1 | 6/2003 | Dickinson |
| 6,621,493 | B1 | 9/2003 | Whitten |
| 6,804,676 | B1 | 10/2004 | Bains, II |
| 6,947,981 | B2 | 9/2005 | Lubbers et al. |
| 7,043,610 | B2 | 5/2006 | Horn et al. |
| 7,076,620 | B2 | 7/2006 | Takeda et al. |
| 7,111,197 | B2 | 9/2006 | Kingsbury et al. |
| 7,117,327 | B2 | 10/2006 | Hirakawa et al. |
| 7,120,768 | B2 * | 10/2006 | Mizuno et al. .............. 711/162 |
| 7,130,975 | B2 | 10/2006 | Suishu et al. |
| 7,139,927 | B2 | 11/2006 | Park et al. |
| 7,159,088 | B2 | 1/2007 | Hirakawa et al. |
| 7,167,963 | B2 | 1/2007 | Hirakawa et al. |
| 7,222,136 | B1 | 5/2007 | Brown et al. |
| 7,296,008 | B2 | 11/2007 | Passerini et al. |
| 7,328,373 | B2 | 2/2008 | Kawamura et al. |
| 7,353,335 | B2 * | 4/2008 | Kawamura ................... 711/114 |
| 7,360,113 | B2 * | 4/2008 | Anderson et al. .............. 714/5 |
| 7,426,618 | B2 * | 9/2008 | Vu et al. ..................... 711/162 |
| 7,516,287 | B2 | 4/2009 | Ahal et al. |
| 7,519,625 | B2 * | 4/2009 | Honami et al. .............. 707/200 |
| 7,519,628 | B1 | 4/2009 | Leverett |
| 7,546,485 | B2 | 6/2009 | Cochran et al. |
| 7,577,867 | B2 | 8/2009 | Lewin et al. |
| 7,590,887 | B2 * | 9/2009 | Kano .......................... 714/15 |
| 7,606,940 | B2 | 10/2009 | Yamagami |
| 7,627,612 | B2 | 12/2009 | Ahal et al. |
| 7,627,687 | B2 | 12/2009 | Ahal et al. |
| 7,757,057 | B2 | 7/2010 | Sangapu et al. |
| 2002/0129168 | A1 | 9/2002 | Kanai et al. |
| 2003/0061537 | A1 | 3/2003 | Cha et al. |
| 2003/0110278 | A1 | 6/2003 | Anderson |
| 2003/0196147 | A1 | 10/2003 | Hirata et al. |
| 2004/0205092 | A1 | 10/2004 | Longo et al. |
| 2004/0250032 | A1 | 12/2004 | Ji et al. |
| 2004/0254964 | A1 * | 12/2004 | Kodama et al. .............. 707/204 |
| 2005/0015663 | A1 | 1/2005 | Armangau et al. |
| 2005/0028022 | A1 | 2/2005 | Amano |
| 2005/0049924 | A1 | 3/2005 | DeBettencourt et al. |
| 2005/0172092 | A1 | 8/2005 | Lam et al. |
| 2005/0273655 | A1 | 12/2005 | Chow et al. |
| 2006/0031647 | A1 | 2/2006 | Hirakawa et al. |
| 2006/0047996 | A1 * | 3/2006 | Anderson et al. .............. 714/2 |
| 2006/0064416 | A1 | 3/2006 | Sim-Tang |
| 2006/0107007 | A1 | 5/2006 | Hirakawa et al. |
| 2006/0117211 | A1 | 6/2006 | Matsunami et al. |
| 2006/0161810 | A1 * | 7/2006 | Bao .............................. 714/6 |
| 2006/0179343 | A1 * | 8/2006 | Kitamura ...................... 714/6 |
| 2006/0195670 | A1 * | 8/2006 | Iwamura et al. ............. 711/162 |
| 2006/0212462 | A1 | 9/2006 | Heller et al. |
| 2007/0055833 | A1 * | 3/2007 | Vu et al. ..................... 711/162 |
| 2007/0162513 | A1 | 7/2007 | Lewin et al. |
| 2007/0180304 | A1 * | 8/2007 | Kano ........................... 714/6 |
| 2007/0198602 | A1 | 8/2007 | Ngo et al. |
| 2007/0198791 | A1 * | 8/2007 | Iwamura et al. ............. 711/162 |
| 2007/0220311 | A1 | 9/2007 | Lewin et al. |
| 2007/0266053 | A1 | 11/2007 | Ahal et al. |
| 2008/0082591 | A1 | 4/2008 | Ahal et al. |
| 2008/0082592 | A1 | 4/2008 | Ahal et al. |
| 2008/0082770 | A1 | 4/2008 | Ahal et al. |

FOREIGN PATENT DOCUMENTS

| | | | |
|---|---|---|---|
| WO | WO 00 45581 A3 | 8/2000 | |

OTHER PUBLICATIONS

Michael Lewin; "Cross Tagging of Data for Consistent Recovery;" U.S. Appl. No. 11/356,920, filed Feb. 17, 2006.

Shlomo Ahal, "Methods and Apparatus for Optimal Journaling for Continuous Data Replication;" U.S. Appl. No. 11/536,215, filed Sep. 28, 2006.

Shlomo Ahal, "Methods and Apparatus for Optimal Journaling for Continuous Data Replication;" U.S. Appl. No. 11/536,233, filed Sep. 28, 2006.

Shlomo Ahal, "Methods and Apparatus for Managing Data Flow in a Continuous Data Replication System Having Journaling;" U.S. Appl. No. 11/536,160 filed Sep. 28, 2006.

Soules, Metadata Efficiency in Versioning File Systems, 2003, pp. 1-16.

AIX System Management Concepts: Operating Systems and Devices May 2000, pp. 1-280.

File downloaded from PAIR for U.S. Appl. No. 11/609,560, filed Dec. 26, 2007, file through Aug. 9, 2010, 265 pages.

File downloaded from PAIR for U.S. Appl. No. 11/356,920, filed Feb. 17, 2006, U.S. Patent No. 7,577,867 Issued on Aug. 18, 2009, file through Aug. 9, 2010, 556 pages.

File downloaded from PAIR for U.S. Appl. No. 10/512,687, filed Aug. 24, 2005, filed through Aug. 9, 2010, 425 pages.

File downloaded from PAIR for U.S. Appl. No. 11/536,215, filed Sep. 28, 2006, U.S. Patent No. 7,516,287 Issued on Apr. 7, 2009, file through Aug. 9, 2010, 167 pages.

File downloaded from PAIR for U.S. Appl. No. 11/536,233, filed Sep. 28, 2006, U.S. Patent No. 7,627,612 Issued on Dec. 1, 2009, file through Aug. 9, 2010, 256 pages.

File downloaded from PAIR for U.S. Appl. No. 11/536,160, filed Sep. 28, 2006, U.S. Patent No. 7,627,687 Issued on Dec. 1, 2009, file through Aug. 9, 2010, 230 pages.

File downloaded from PAIR for U.S. Appl. No. 11/964,168, filed Dec. 26, 2007, file through Aug. 9, 2010, 364 pages.

Microsoft Computer Dictionary, 2002 Press Fifth Edition, p. 58.

Soules et al.; "Metadata Efficiency in a Comprehensive Versioning File System", May 2002, CMU-CS-02-145, School of Computer Science, Carnegie Mellon University, Pittsburgh, PA 15213, 33 pages.

File downloaded from PAIR for U.S. Appl. No. 12/057,652, filed Mar. 28, 2008, file downloaded Aug. 27, 2010, 219 pages.

* cited by examiner

METHODS AND APPARATUS FOR MULTIPLE POINT IN TIME DATA ACCESS

CROSS-REFERENCE TO RELATED APPLICATIONS

The present application claims the benefit of U.S. Provisional Patent Application No. 60/753,263, filed on Dec. 22, 2005, which is incorporated herein by reference.

BACKGROUND

As is known in the art, computer data is vital to today's organizations, and a significant part of protection against disasters is focused on data protection. As solid-state memory has advanced to the point where the cost of memory has become a relatively insignificant factor, organizations can afford to operate with systems that store and process terabytes of data.

Conventional data protection systems include tape backup drives, for storing organizational data on a periodic basis. Such systems suffer from several drawbacks. First, they require a system shutdown during backup, since the data being backed up cannot be used during the backup operation. Second, they limit the points in time to which the organization to recover. For example, if data is backed up on a daily basis, there may be several hours of lost data in the event of a disaster. Third, the data recovery process itself takes a relatively long time.

Another conventional data protection system uses data replication, by creating a copy of the organization's data on a secondary backup storage system, and updating the backup occur with changes. The backup storage system may be situated in the same physical location as the production storage system, or in a physically remote location. Data replication systems generally operate either at the application level, or at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization data is unavailable, during a recovery, and (ii) enable recovery as close a possible to any specified point in time within a recent history.

Continuous data protection typically uses a technology referred to as "journaling", whereby a log is kept of changes made to the backup storage. During a recovery, the journal entries serve as successive "undo" information, enabling rollback of the backup storage to previous points in time.

SUMMARY

The present invention provides systems and methods for efficient data access and recovery by enabling access to data that was in a storage system at an earlier point in time, while simultaneously performing a storage rollback. Such access is uninterrupted when the rollback is completed, thus minimizing system down time during a recovery operation.

In one aspect of the invention, a method comprises accessing data from a previous point in time, including receiving data stored in a storage system of addressable memory, the storage system including a plurality of addresses, receiving a journal history of write transactions for the storage, each write transaction including (i) a plurality of designated memory addresses, (ii) a corresponding plurality of current data to write in the designated memory addresses for storage, and (iii) a time indicator, generating a data structure that represents a virtual interface to the storage at a specified point in time, based on the write transactions in the journal history having a time subsequent to the specified point in time, and enabling a user to process data from the specified point in time, via the virtual interface and the journal history.

In another aspect of the invention, a data access system comprises a data recovery system, including a storage system of addressable memory, the storage system including data stored at a plurality of addresses, a journal history of write transactions for the storage system, each write transaction including (i) a plurality of designated memory addresses, (ii) a corresponding plurality of current data to write in the designated memory addresses for storage, and (iii) a time indicator, a data protector, including a data protector memory, a journal processor for generating a data structure, stored within the data protector memory, which represents a virtual interface to the storage at a specified point in time, based on the write transactions in the journal having a data and time subsequent to the specified point in time, a storage manager for rolling back the storage to the data that was stored therein at the specified point in time, based on the journal of write transactions, while a user is using the virtual interface to the storage, and a data protector switcher for switching from the virtual storage interface via the journal history, over to a direct interface to the rolled back storage, after completion of the rolling back, thereby enabling the user to continue data processing without interruption, and a host application driver for enabling a user to process data from the specified point in time, via the virtual interface and the journal history.

In a further aspect of the invention, a computer-readable storage medium comprises program code for causing at least one computing device to receive data stored in a storage system of addressable memory, the storage system including a plurality of addresses, to receive a journal history of write transactions for the storage, each write transaction including (i) a plurality of designated memory addresses, (ii) a corresponding plurality of current data to write in the designated memory addresses for storage, and (iii) a time indicator, to generate a data structure that represents a virtual interface to the storage at a specified point in time, based on the write transactions in the journal history having a time subsequent to the specified point in time, and to enable a user to process data from the specified point in time, via the virtual interface and the journal history.

Another aspect of the invention comprises a method for data access, including for a host device designated as Device A within a host computer, the host device corresponding to a first logical storage unit designated as LUN A, where LUN A is configured to access data directly from a physical storage system, assigning a second logical storage unit, designated as LUN X, wherein LUN X is configured to access the storage system indirectly via a data protection computer, providing the data protection computer access to a data structure that is able to recover data that was stored in the storage system at an earlier point in time, T1, and in response to a request from the host computer for data that was stored in the storage system at time T1, switching Device A to get its data from LUN X instead of from LUN A.

In yet another aspect of the invention, a data access system comprises a physical storage system, a data protection computer for accessing a data structure that is able to recover data that was stored in the storage system at an earlier point in time, T1; and a host computer connected with said physical storage system, including a host device designated as Device A and corresponding to a first logical storage unit designated as LUN A, where LUN A is configured to access data directly from the storage system, and a host driver (i) for assigning a second logical storage unit, designated as LUN X, to Device A, wherein LUN X is configured to access the storage system indirectly via the data protection computer, and (ii) for switching Device A to get its data from LUN X instead of from LUN A, in response to a request from the host computer for data that was stored in said storage system at time T1.

In a still further aspect of the invention, a data access system comprises a physical storage system including a controller for exposing at least one logical storage unit, a data protection computer for accessing a data structure that is able to recover data that was stored in the storage system at an earlier point in time, T1, and a host computer connected with the storage system, comprising a host device designated as Device A and corresponding to a first logical storage unit designated as LUN A, where LUN A is configured to access data directly from the storage system, wherein the storage system controller is operable to assign a second logical storage unit, designated as LUN X, to Device A, wherein LUN X is configured to access the storage system indirectly via said data protection computer, and wherein the host computer is operable to switch Device A to get its data from LUN X instead of from LUN A, in response to a request from for data that was stored in the storage system at time T1.

In another aspect of the invention, a data access system comprises a physical storage system, a data protection computer for accessing a data structure that is able to recover data that was stored in the storage system at an earlier point in time, T1, and a host computer connected with the physical storage system, comprising a host device designated as Device A and corresponding to a first logical storage unit designated as LUN A, where LUN A is configured to access data directly from the storage system, wherein the data protection computer is operable to assign a second logical storage unit, designated as LUN X, to Device A, wherein LUN X is configured to access the storage system indirectly via said data protection computer, and wherein the host computer is operable to switch Device A to get its data from LUN X instead of from LUN A, in response to a request from the host computer for data that was stored in said storage system at time T1.

In a further aspect of the invention, a computer-readable storage medium comprises program code for causing a host computer that comprises a host device designated as Device A and corresponding to a first logical storage unit designated as LUN A, where LUN A is configured to access data directly from a storage system to assign a second logical storage unit, designated as LUN X, wherein LUN X is configured to access the storage system indirectly via a data protection computer, to provide the data protection computer access to a data structure that is able to recover data that was stored in the storage system at an earlier point in time, T1, and to switch Device A to get its data from LUN X instead of from LUN A, in response to a request from the host computer for data that was stored in the storage system at time T1.

BRIEF DESCRIPTION OF THE DRAWINGS

The present invention will be more fully understood and appreciated from the following detailed description, taken in conjunction with the drawings in which.

DETAILED DESCRIPTION

Figure 1:
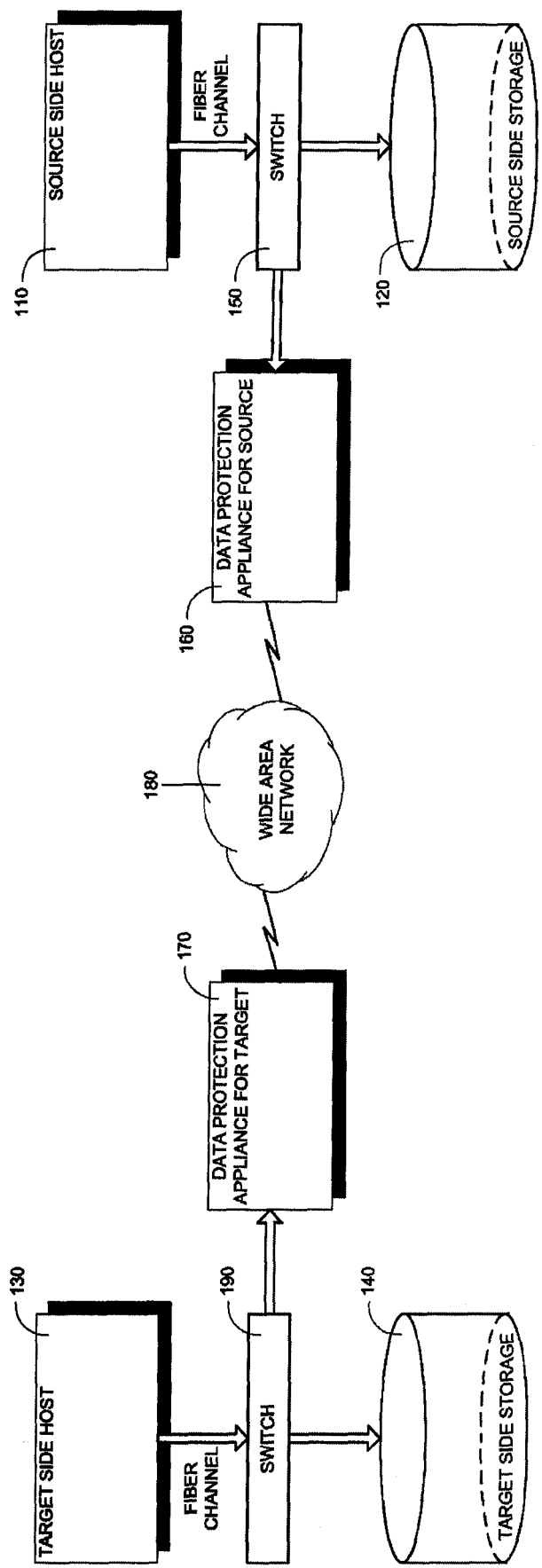
FIG. 1 is a block diagram of a data protection system, in accordance with an exemplary embodiment of the present invention.

FIG. 1 is a simplified block diagram of a data protection system, in accordance with an exemplary embodiment of the present invention. The components in FIG. 1 are arranged into two groups; namely, source side components on the left, and target side components on the right. The source side represents a production site with a host computer 110 running a host application, and a storage system 120 storing host data in addressable storage locations. The target represents a data replication site, with its own host computer 130, and its own storage system 140 that is used to store a copy of the data in storage system 120, as well as additional data.

The source and target sides are connected via a wide area network (WAN) 180. Each host computer and its corresponding storage system are coupled through a storage area network (SAN) that includes network switches, such a fiber channel switches. The communication links between each host computer and its corresponding storage system, may be any appropriate medium suitable for data transfer, such as fiber communication channel links.

Host computers 110 and 130 may each be implemented as one computer, or as a plurality of computers, or as a network of distributed computers. Generally, a host computer runs one or more applications, such as database applications and e-mail servers.

Each storage system 120 and 140 includes one or more physical storage devices, such as single disks or redundant arrays of inexpensive disks (RAID). Storage system 140 generally includes a copy of storage system 120, as well as additional data.

In the course of continuous operation, host computer 110 issues I/O requests (write/read operations) to storage system 120 using, for example, small computer system interface (SCSI) commands. Such requests are generally transmitted to storage system 120 with an address that includes a specific device identifier, an offset within the device, and a data size. Offsets are generally granularized to 512 byte blocks. The average size of a write operation issued by the host computer may be, for example, 10 kilobytes (KB); i.e., 20 blocks. For an I/O rate of 50 megabytes (MB) per second, this corresponds to approximately 5,000 write transactions per second.

In accordance with an exemplary embodiment of the present invention, a replica of every write operation issued by host computer 110 to storage system 120 is transmitted to a source-side data protection appliance (DPA) 160. In one embodiment, DPA 160, and its counterpart at the target side DPA 170, include their own internal memories and computing processors. In the architecture illustrated in FIG. 1 the DPAs are standalone devices integrated within a SAN. Alternatively, the DPAs may be integrated into the respective storage systems, or integrated into the respective host computers. The DPAs communicate with their respective hosts through communication lines such as fiber channels.

In accordance with an exemplary embodiment of the present invention, DPA 160 and DPA 170 are "initiators"; i.e., the DPAs can issue I/O requests using, for example, SCSI commands, to storage devices of their respective storage systems. Specifically, the DPAs may issue I/O requests to one or more storage devices of their respective storage systems, referred to as "journal volumes". The DPAs are also programmed with the necessary functionality to act as a "target"; i.e., to reply to I/O requests, such as SCSI commands, issued by other initiators, such as their respective host computer.

DPA 160 sends write transactions over a wide area network 180 to a second DPI 170 at the target side, for incorporation within target storage system 140. DPA 160 may send its write transactions to DPA 170 using a variety of modes of transmission, including inter alia (i) a synchronous mode, (ii) an asynchronous mode, and (iii) a snapshot mode. In synchronous mode, DPA 160 sends each write transaction to DPA 170, receives back an acknowledgement, and in turns sends an acknowledgement back to host computer 110. Host computer waits until receipt of such acknowledgement before issuing further write transactions. In asynchronous mode, DPA 160 sends an acknowledgement to host computer 110 upon receipt of each write transaction, before receiving an acknowledgement back from DPA 170. In snapshot mode, DPA 160 receives several write transactions and combines them into an aggregate "snapshot" of all write activity performed in the multiple write transactions, and sends such snapshots to DPA 170, for incorporation in target storage system 140.

For the sake of clarity, the ensuing discussion assumes that information is transmitted at a write-by-write granularity. During normal operations, the direction of replicate data flow goes from source side to target side. Generally, during data recovery the direction of replicate data flow is reversed, with the target side behaving as if it were the source side, and vice versa. To this end, the target side also includes a switch 190, making the target side symmetric with the source side.

In accordance with an exemplary embodiment of the present invention, DPA 160 is operative to send write transactions from the source side to the target side. DPA 170 is operative to maintain a journal history of write transactions, as described in detail hereinbelow. Journal histories may be stored in a journal volume. Such journal volume may include one or more physical storage device units, or it may be a part of a storage system. The size of the journal volume determines the size of a journal history that can be stored. A possible size for a journal volume is 500 GB. Since the source side has the capability to act as a target side, a journal volume is also defined at the source side.

The system shown in FIG. 1 is intended to be representative of a data protection system, and actual systems may vary in architecture and network topology. Additional safety measures may be used in such a system. Thus, each DPA may in fact be a cluster of computers, thereby ensuring that if a DPA computer is down, then the DPA functionality switches over to another computer.

It will be appreciated that in practice the architecture may vary from one organization to another. Thus, although the target side is illustrated as being remote from the source side in FIG. 1, in some systems the two sides may be at the same local site. Local data replication is faster than remote data replication, and the lag between target and source is minimal, but remote data replication has the advantage of being robust in the event that a disaster occurs at the source side. It is also anticipated that the present invention be implemented within a source side architecture alone, without there being a target side.

Figure 2A:
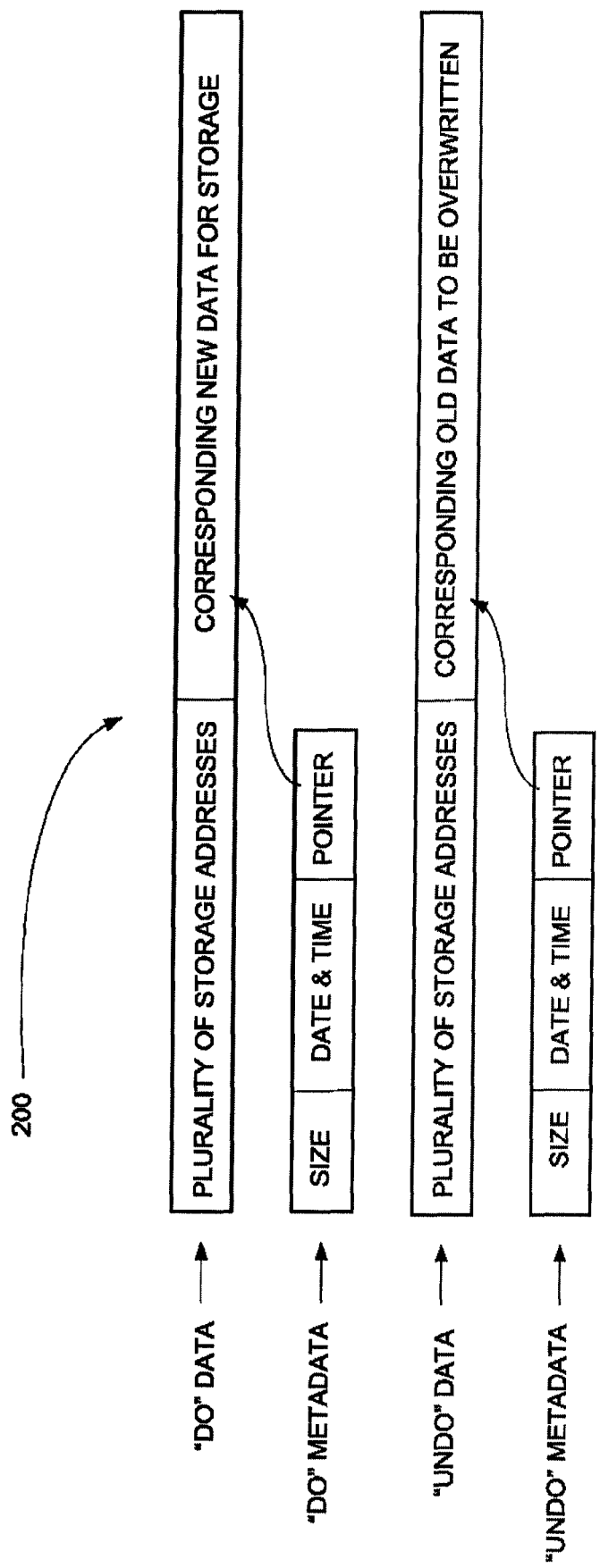
FIG. 2A is an illustration of a journal history of write transactions for a storage system, in accordance with an exemplary embodiment of the present invention.

FIG. 2A is a simplified illustration of a journal history 200 of write transactions for a storage system, in accordance with an exemplary embodiment of the present invention. A write transaction generally includes the following fields:

a time at which the transaction was received by the source side DPA;

a write length;

a location in the storage system to which the data is written; and the data itself.

Write transactions are transmitted from source side DPA 160 to target side DPA 170. As shown in FIG. 2A, DPA 170 can record the received write transactions in four streams. A first stream, referred to as a DO stream, includes new data for writing in the storage system. A second stream, referred to as an DO METADATA stream, includes metadata for the write transaction, such as an identifier, a date & time, a write size, a beginning address in the data volume for writing the new data in, and a pointer to the offset in the do stream where the corresponding data is located. Similarly, a third stream, referred to as an UNDO stream, includes old data that is overwritten in the data volume; and a fourth stream, referred to as an UNDO METADATA, include an identifier, a date & time, a write size, a beginning address in the data volume where data is to be overwritten, and a pointer to the offset in the undo stream where the corresponding old data is located.

In practice each of the four streams holds a plurality of write transaction data. As write transactions are received dynamically by target DPA 170, they are recorded at the end of the DO stream and the end of the DO METADATA stream, prior to committing the transaction. During transaction application, when the various write transactions are applied to the storage system, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream for writing into addresses within the storage system. Prior to writing the UNDO data into these addresses, the newer data residing in such addresses is recorded in the DO stream.

More specifically, in accordance with an exemplary embodiment of the present invention, journal history 200 is stored within a specific storage volume, or striped over several volumes, referred to collectively as a "journal volume". Journal history 200 may have its own partition within a volume.

The journal volume can be partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 170, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

When a write transaction is received, journaling is thus advanced as follows.

Step 1: The new data is written at the end of the DO stream, assuming a forward write direction, and corresponding metadata is written at the end of the DO METADATA stream.

Step 2: Data is read from the beginning of the DO stream, and corresponding metadata is read from the beginning of the DO METADATA stream.

Step 3: Old data to be overwritten is read from the storage system. The location and size of such old data is determined from the DO METADATA stream.

Step 4: The old data is written at the end of the UNDO stream, and corresponding metadata is written at the end of the UNDO METADATA stream.

Step 5: The new data read at step 2 is written into the storage system, and the beginning and end pointers of the DO and DO METADATA streams are moved appropriately.

Conversely, during a rollback to undo a write transaction, the above operations are reversed, as follows:

Step 1: Read the data and metadata from the end of the UNDO and UNDO METADATA streams.

Step 2: Read from the storage system the data that is to be overwritten. The location and size of such data is determined from the UNDO METADATA stream.

Step 3: Write the data from step 2 at the beginning of the DO stream, and update the DO METADATA stream accordingly.

Step 4: Write the data from step 1 to the storage system, and update the beginning and end pointers of the UNDO and UNDO metadata streams appropriately.

The following example, in conjunction with FIGS. 2B-2E, describes specific details of the journaling process, in accordance with an exemplary embodiment of the present invention. A journal volume includes a plurality of segments from a segment pool, each segment including 20 data blocks.

Three write transactions are received, as indicated in TABLE I.

TABLE I

Example Write Transactions

| Write ID | Group ID | Time | Data volume location | Length | Journal Volume location |
|---|---|---|---|---|---|
| 1 | 1 | Dec. 3, 2005 10:00:00.00 | Vol. 1, offset 57 blocks | 15 blocks | Segment 1, offset 0 |
| 2 | 1 | Dec. 3, 2005 10:00:00.05 | Vol. 1, offset 87 blocks | 20 blocks | Segment 1, offset 15 |
| 3 | 1 | Dec. 3, 2005 10:00:00.18 | Vol. 2, offset 12 blocks | 20 blocks | Segment 3, Offset 15 |

The following discussion describes four stages of journaling and data storage; namely, Stage #1: Enter the three write transactions as journal entries in the journal volume.

Stage #2: Apply the first write transaction to the data volume.

Stage #3: Apply the second write transaction to the data volume.

Stage #4: Rollback the second write transaction, to recover data from an earlier point in time.

The write transaction with ID=1 is written to the first 15 blocks of Segment #1. The metadata corresponding to this transaction is written to the first block of Segment #2. The second write transaction with ID=2 is written to the last 5 blocks of Segment #1 and the first 15 blocks of Segment #3. The metadata corresponding to this transaction is written to the second block of Segment #2. The third write transaction with ID=3 is written to the last 5 blocks of Segment #3 and the first 15 blocks of Segment #4. The metadata corresponding to this transaction is written to the third block of Segment #2.

Figure 2B:
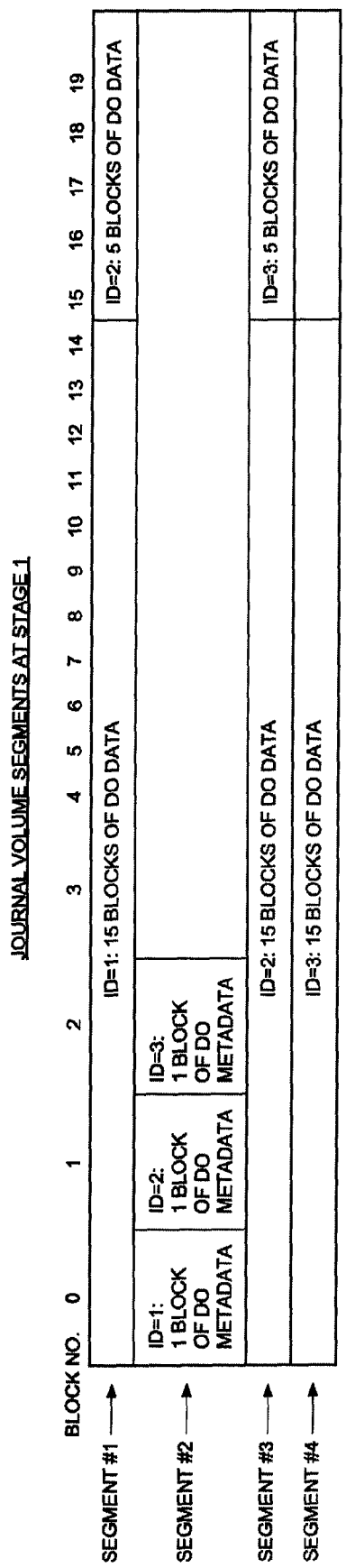
FIG. 2B is an illustration of a first stage of a journal history and four data streams stored therein, after recording three write transactions, in accordance with an exemplary embodiment of the present invention.

Thus at stage #1, the DO stream in memory includes a list of segments 1, 3, 4; and a beginning pointer to offset=0 in Segment #1 and an end pointer to offset=10 in Segment #4. The DO METADATA stream in memory includes a list of one segment, namely Segment #2; and a beginning pointer to offset=0 in Segment #2 and an end pointer to offset=3 in Segment #2. The UNDO stream and the UNDO METADATA stream are empty. The journal history and the four streams at the end of stage #1 are illustrated in FIG. 2B.

At stage #2 the write transaction with ID=1 is applied to the storage system. New data to be written as read from the journal volume at the offset and length indicated in the DO METADATA; namely, 15 blocks of data located in blocks 0-14 of journal volume Segment #1. Correspondingly, old data is read from the storage data volume at the offset and length indicated in the UNDO METADATA; namely, 15 blocks of data located in blocks 57-71 of Data Volume #1. The old data is then written into the UNDO stream in the journal volume, and the associated metadata is written into the UNDO METADATA stream in the journal volume. Specifically, for this example, the UNDO data is written into the first 15 blocks of Segment #5, and the UNDO METADATA is written into the first block of Segment #6. The beginning pointer of the UNDO data stream is set to offset=0 in Segment #5, and the end pointer is set to offset=15 in Segment #5. Similarly, the beginning pointer of the UNDO METADATA stream is set to offset=0 on Segment #6, and the end pointer is set to offset=1 in Segment #6.

Figure 2C:
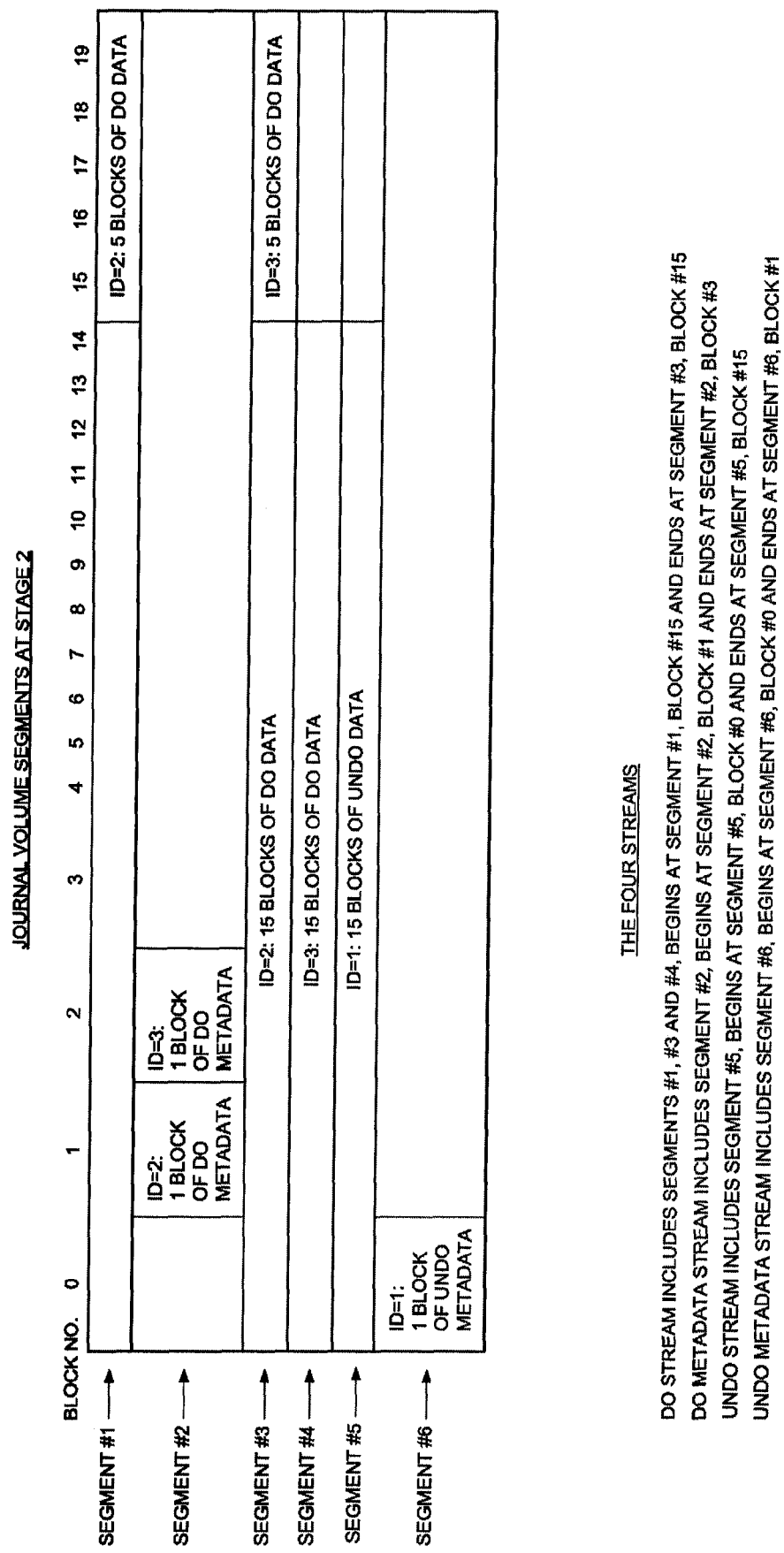
FIG. 2C is an illustration of a second stage of a journal history and four data streams stored therein, after applying a first write transactions to a storage system, in accordance with an exemplary embodiment of the present invention.

At this point, the new data that was read from blocks 0-14 of journal volume Segment #1 is written to blocks 57-71 of Data Volume #1. The beginning pointer for the DO stream is moved forward to block 15 of journal volume Segment #1, and the beginning pointer for the DO METADATA stream is moved forward to block 1 of journal volume Segment #2. The journal history and the four streams at the end of stage #2 are illustrated in FIG. 2C.

At stage #3 the write transaction with ID=2 is applied to the storage system. As above, 20 blocks of new data are read from blocks 15-19 of journal volume Segment #1 and from blocks 0-14 of journal volume Segment #3. Similarly, 20 blocks of old data are read from blocks 87-106 of Data Volume #1. The old data is written to the UNDO stream in the last 5 blocks of journal volume Segment #5 and the first 15 blocks of journal volume Segment #7. The associated metadata is written to the UNDO METADATA stream in the second block of Segment #6. The list of segments in the UNDO stream includes Segment #5 and Segment #7. The end pointer of the UNDO stream is moved to block 15 of Segment #7, and the end pointed of the UNDO METADATA stream is moved to block 2 of Segment #6.

Figure 2D:
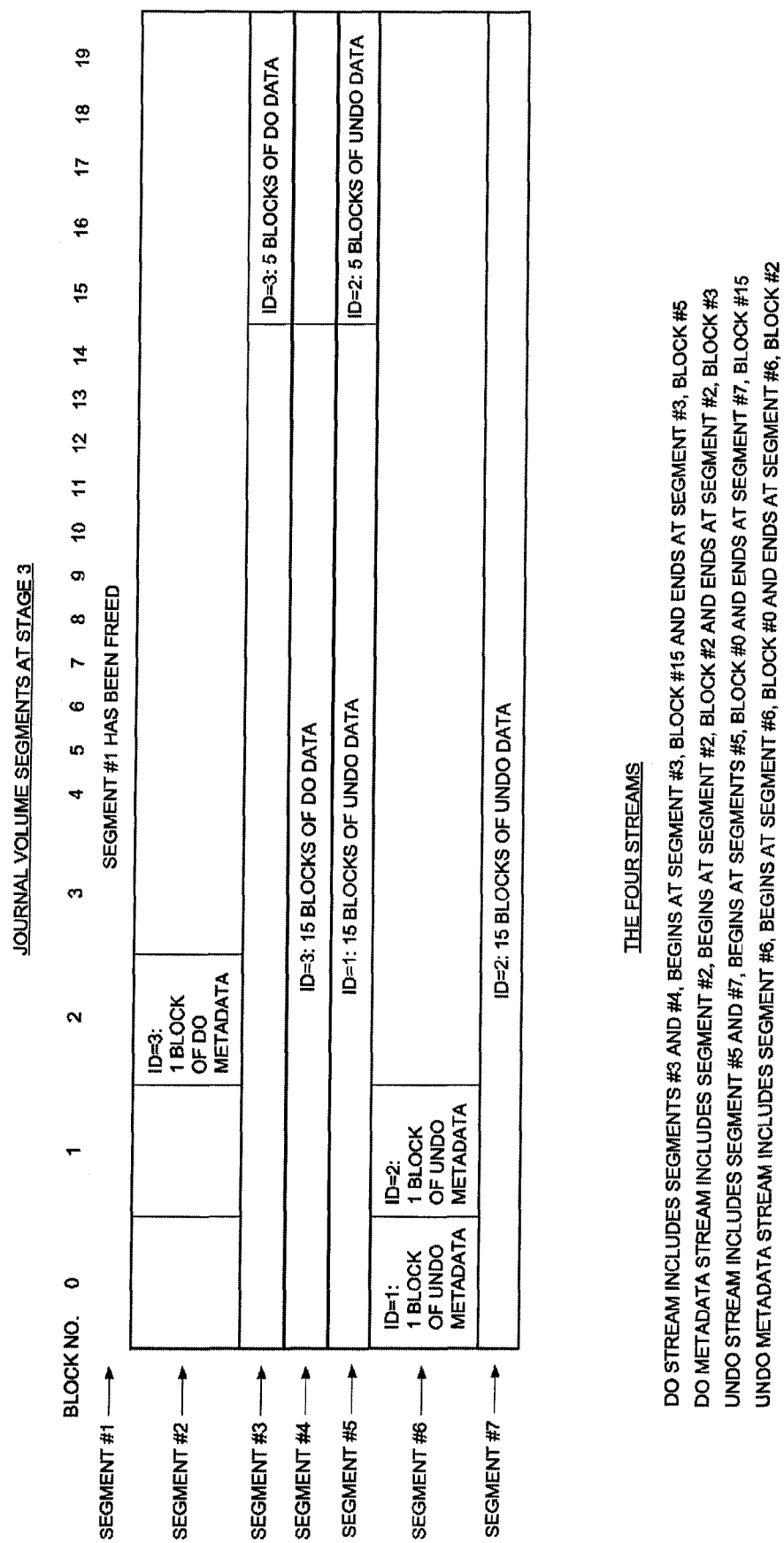
FIG. 2D is an illustration of a third stage of a journal history and four data streams stored therein, after applying a second write transactions to a storage system, in accordance with an exemplary embodiment of the present invention.

Finally, the new data from blocks 15-19 of journal volume Segment #1 and blocks 0-14 of journal volume Segment #3 is written into blocks 87-106 of Data Volume #1. The beginning pointer for the DO stream is moved forward to block 15 of journal volume Segment #3, and the beginning pointer for the DO METADATA stream is moved forward to block 2 of journal volume Segment #2. Segment #1 is freed from the DO stream, for recycling within the segment pool, and the list of segments for the DO stream is changed to Segment #3 and Segment #4. The journal history and the four streams at the end of stage #3 are illustrated in FIG. 2D.

At stage #4 a rollback to time 10:00:00.00 is performed. I.e., the write transaction with ID=2 is to be undone. The last entry is read from the UNDO METADATA stream, the location of the end of the UNDO METADATA stream being determined by its end pointer. I.e., the metadata before block 2 of journal volume Segment #6 is read, indicating two areas each of 20 blocks; namely, (a) the last 5 blocks of journal volume Segment #5 and the first 15 blocks of journal volume Segment #7, and (b) blocks 87-106 of Data Volume #1. Area (a) is part of the UNDO stream.

The 20 blocks of data from area (b) are read from Data Volume #1 and written to the beginning of the DO stream. As the beginning pointer of the DO stream is set to offset=15 of journal volume Segment #3, 5 blocks are written at the end of Segment #3, and the remaining 15 blocks are written to Segment #8. The end pointer for the DO stream is set to block 15 of Segment #8. The list of segments for the DO stream is changed to Segment #3, Segment #4 and Segment #8. The metadata associated with the 20 blocks from area (b) is written to block 3 of Segment #2, and the end pointer of the DO METADATA stream is advanced to block 4 of Segment #2.

Figure 2E:
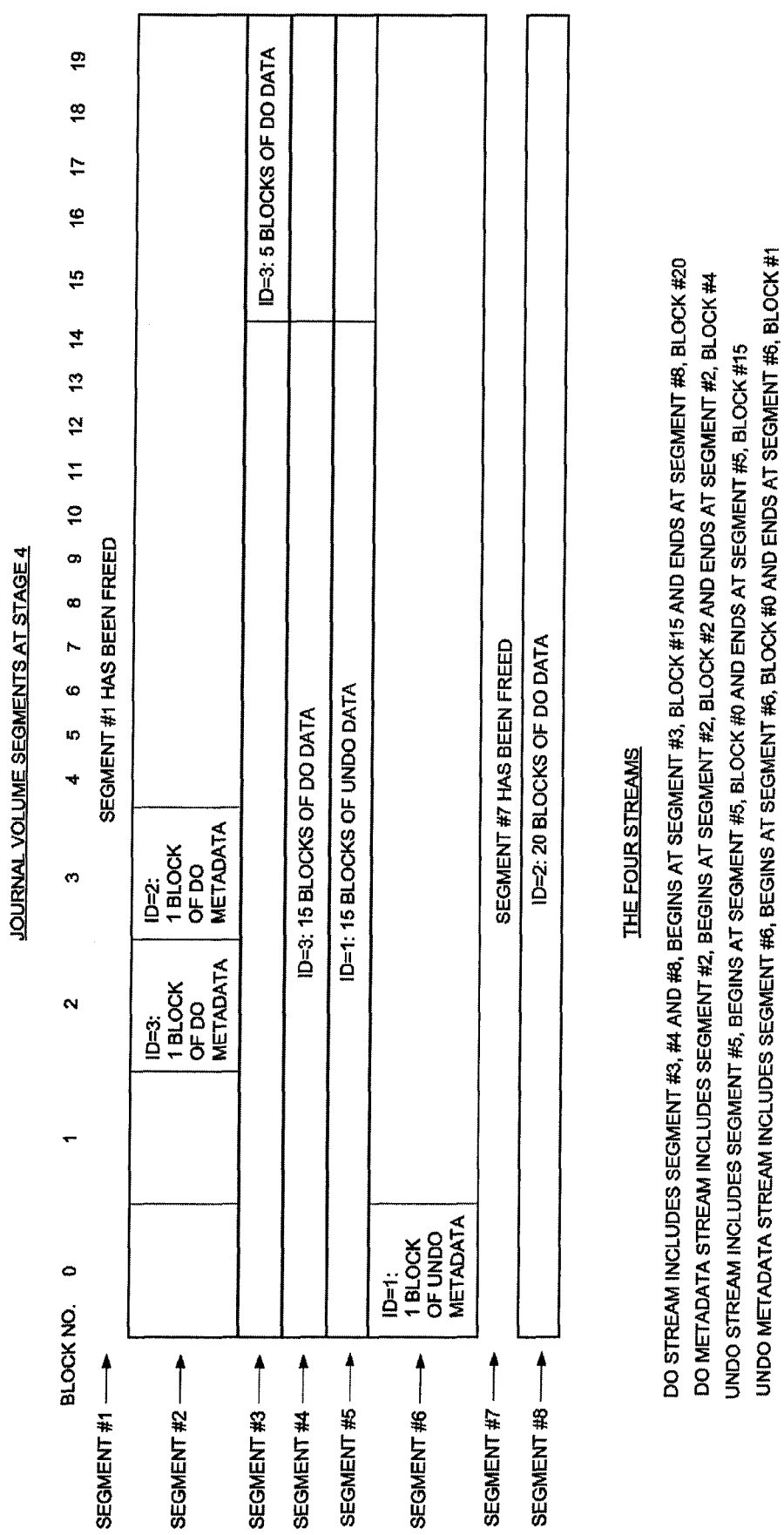
FIG. 2E is an illustration of a fourth stage of a journal history and four data streams stored therein, after rolling back a write transaction, in accordance with an exemplary embodiment of the present invention.

The 20 blocks of data in area (a) of the journal volume are then written to area (b) of the data volume. Finally, Segment #7 is freed for recycling in the segment pool, the UNDO stream ending pointer is moved back to Segment #5 of the journal volume, block 15, and the UNDO METADATA stream ending pointed is moved back to Segment #6 of the journal volume, block 1. The journal history and the four streams at the end of stage #4 are illustrated in FIG. 2E.

Thus it may be appreciated that Journal history 200 is thus used to rollback storage system 140 to the state that it was in at a previous point in time. Journal history is also used to selectively access data from storage 140 at such previous point in time, without necessarily performing a rollback. Selective access is useful for correcting one or more files that are currently corrupt, or for simply accessing old data.

Figure 3:
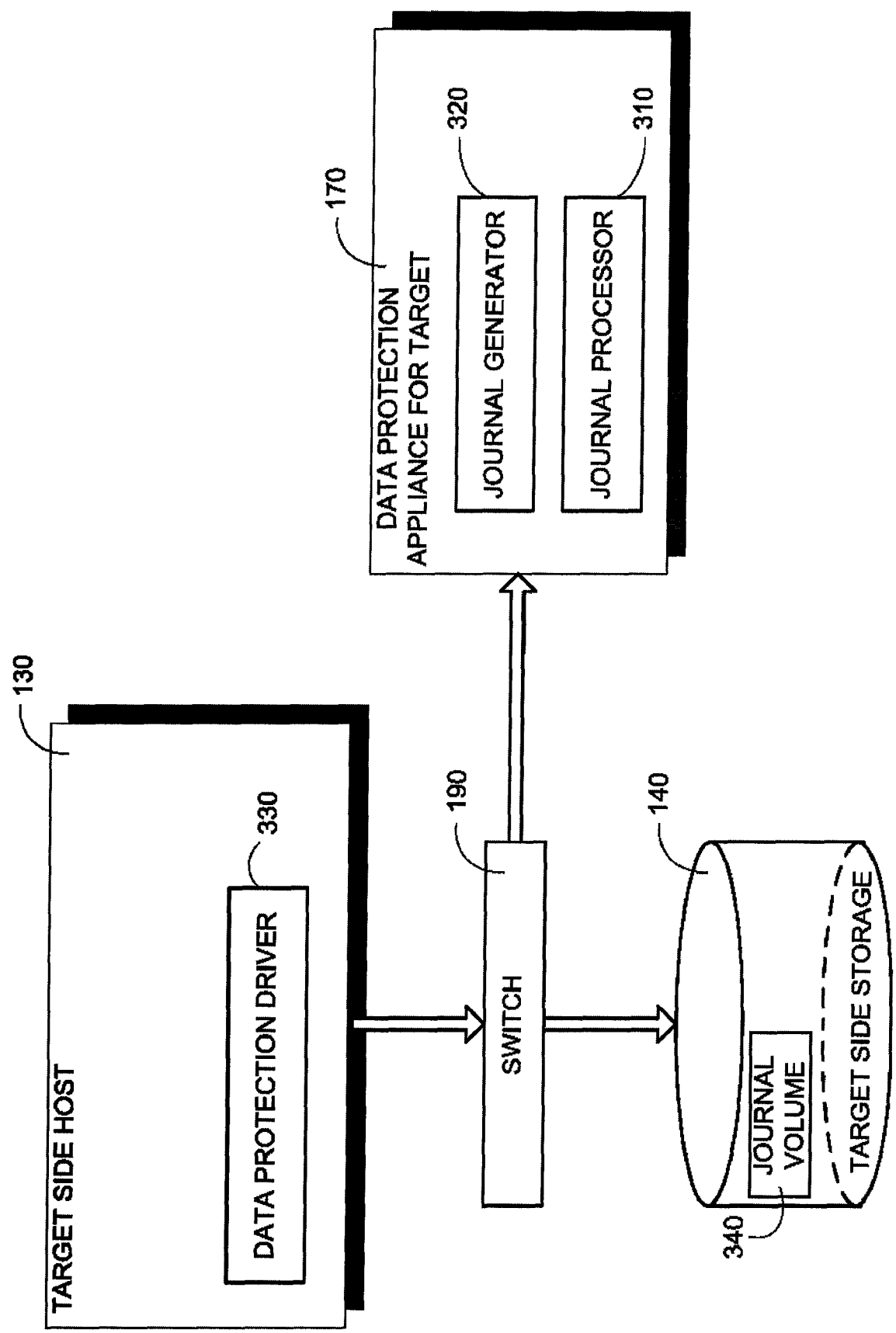
FIG. 3 is a block diagram of a point in time data recovery system, in accordance with an exemplary embodiment of the present invention.

Reference is now made to FIG. 3, which is a simplified block diagram of a point in time data recovery system, in accordance with an exemplary embodiment of the present invention. Shown in FIG. 3 is target side host 130, target side storage system 140 and target side DPA 170 from FIG. 1. Target side DPA includes a journal processor 310 and a journal generator 320. Target side host 130 includes a DPA driver 330. Operation of these components is described in detail hereinbelow. In the configuration of FIG. 3, a journal volume 340 resides within storage system 140.

DPA drivers can be installed on both source side host computer 110 and target side host computer 130. During normal operation, the DPA driver on source side host computer 110 acts as a "splitter", to intercept SCSI I/O commands in its data path, to replicate these commands, and to send a copy to the DPA. A DPA driver may reside on a host computer within a switch, such as switch 150.

Journal history 200 from FIG. 2 may be used to provide an adaptor for access to storage 140 at the state it was in at any specified point in time. Since journal history 200 contains the "undo" information necessary to rollback storage system 140, data that was stored in specific memory locations at the specified point in time may be obtained by undoing write transactions that occurred subsequent to such point in time. In general, however, using journal history 200 in this manner to rollback storage system 140 requires a lot of I/O requests. At a production data rate of 50 MB/sec. with write transactions of average size 10 KB, each second of journal history 200 includes approximately 5,000 write transactions. To rollback one hour of time, for example, requires undoing 3,600* 5,000=18,000,000 transactions.

The present invention provide efficient ways to use journal history 200 by an adaptor to access data that was stored in dynamically changing storage system 140 at a specified point in time. As described more fully with respect to FIGS. 4-7 below, journal processor 310 prepares a data structure that optimizes access to data in storage system 140 from a previous state. Journal processor 310 stores at least a portion of such data structure in memory of DPA 170, and host computer 130 indirectly accesses storage system 140 via the data structure in DPA 170. Thus, journal processor 310 serves as an adaptor for accessing storage system 140 at a specified point in time.

While host computer is accessing and processing old data that was stored in storage system 140, new data is being generated through new write transactions. To manage such new write transactions, journal generator 310 generates an auxiliary journal history, dedicated to tracking target side data processing that operates on old data.

Figure 4:
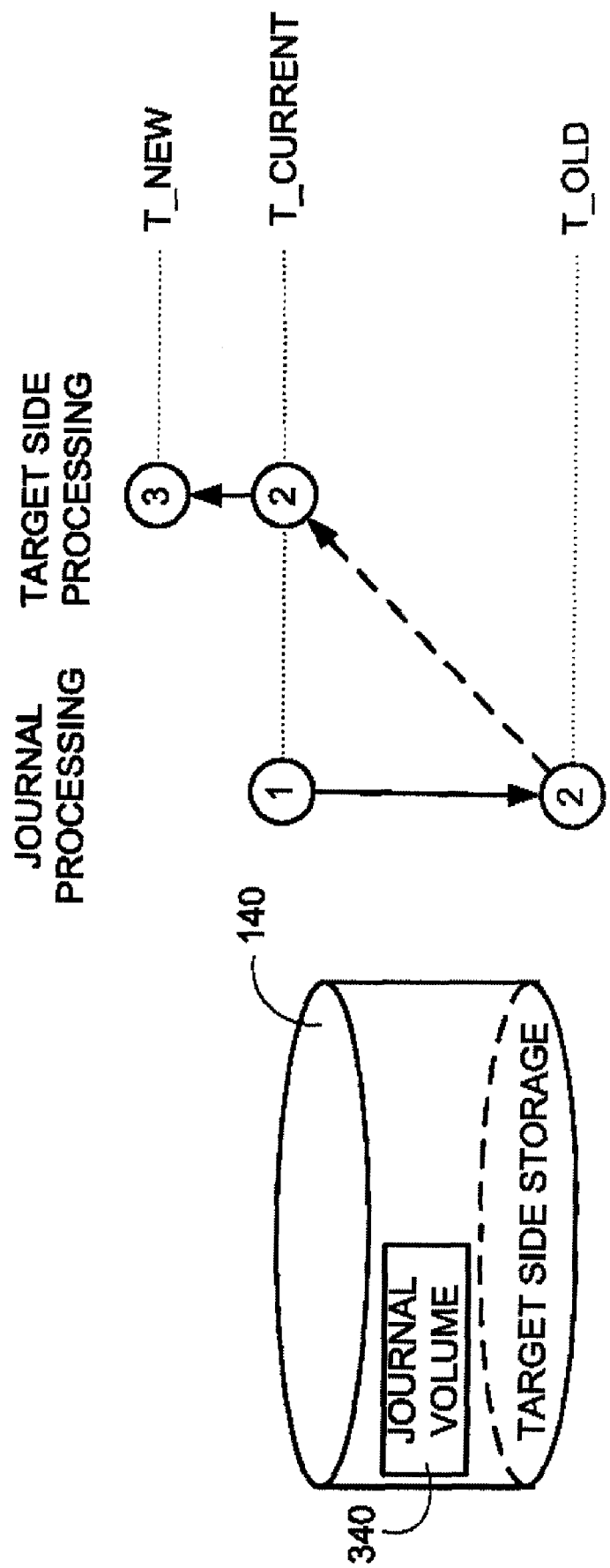
FIG. 4 is an illustration of a time-line for tracking new processing of old data, in accordance with an exemplary embodiment of the present invention.

Reference is now made to FIG. 4, which is a simplified illustration of a time-line for tracking new processing of old data, in accordance with an exemplary embodiment of the present invention. FIG. 4 illustrates journal processor 310 bringing the timeline back to a previous time, T_OLD, and journal generator 320 recording new write transactions as target side processing brings the timeline forward from time T_CURRENT to T_NEW, thereby skipping the portion of journal history 200 between time T_OLD and T_CURRENT. As shown in FIG. 4, current data at time (1) is rolled back to old data at time (2). The rolled back data is used moved up in time to current data (2), thereby effectively skipping over the rolled back data between (1) and (2), which may be corrupt. From current data (2), target side processing advances to new data at time (3); i.e., the target side processing is applied to data (2) and not to data (1). In implementation, the data between (1) and (2) is not actually skipped over—instead, the DO stream from the auxiliary journal history, stored by journal generator 320, is used instead of the DO stream from the primary journal history 200.

Figure 5:
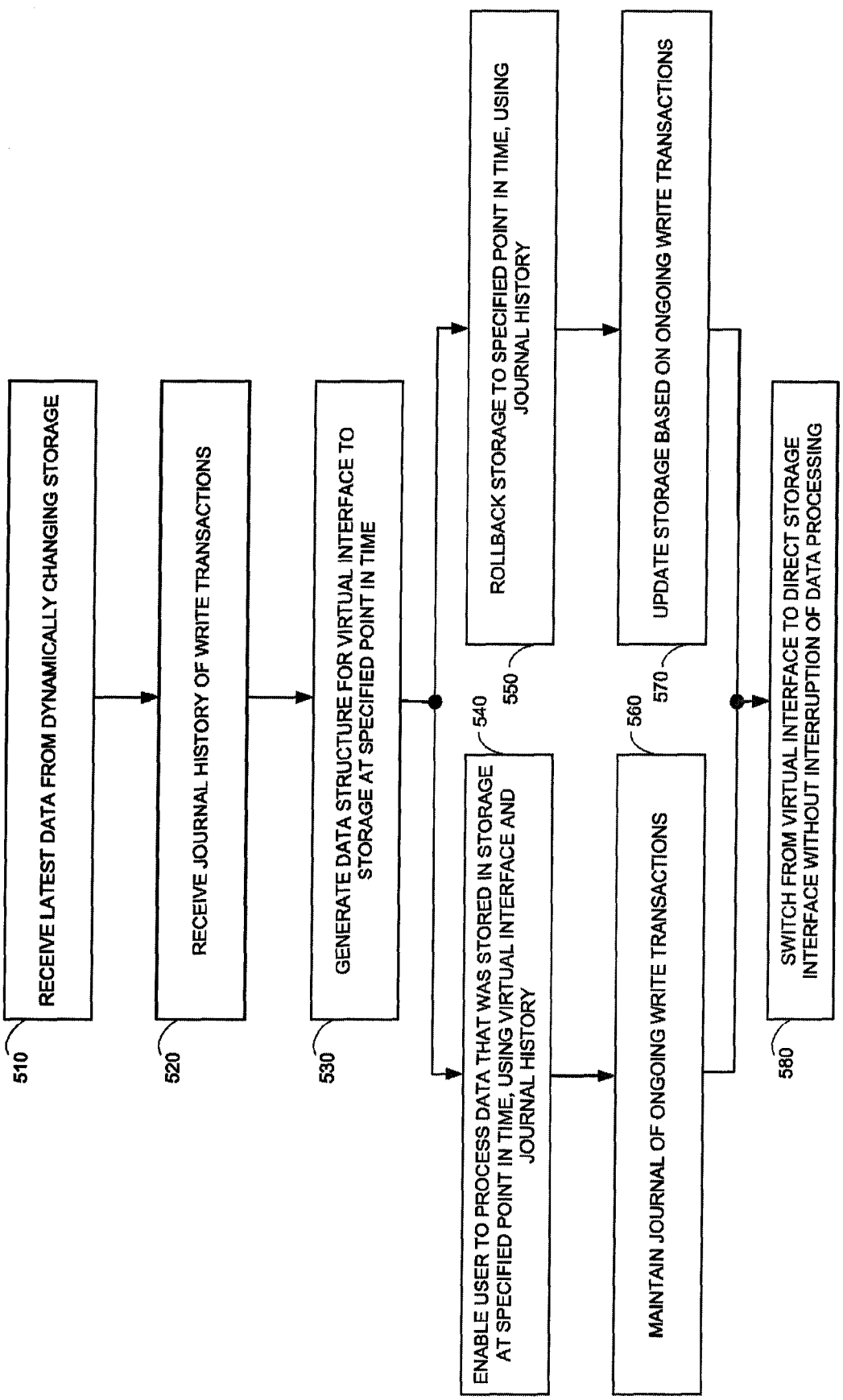
FIG. 5 is a flowchart of a method for point in time data recovery, in accordance with an exemplary embodiment of the present invention.

Reference is now made to FIG. 5, which is a simplified flowchart of a method for point in time data recovery, in accordance with an exemplary embodiment of the present invention. At step 510 the method receives access to latest data from a dynamically changing storage, such as storage system 140 of FIG. 1, and at step 520 the method receives access to a journal history 200, such as journal history 200 of FIG. 2.

At step 530 the method generates a data structure for a virtual interface to the storage at the state it was in at a specified earlier point in time. In one embodiment of the present invention, the data structure generated at step 530 is a binary tree, and the data stored in the nodes of the binary tree includes sequential intervals of memory addresses.

Figure 6:
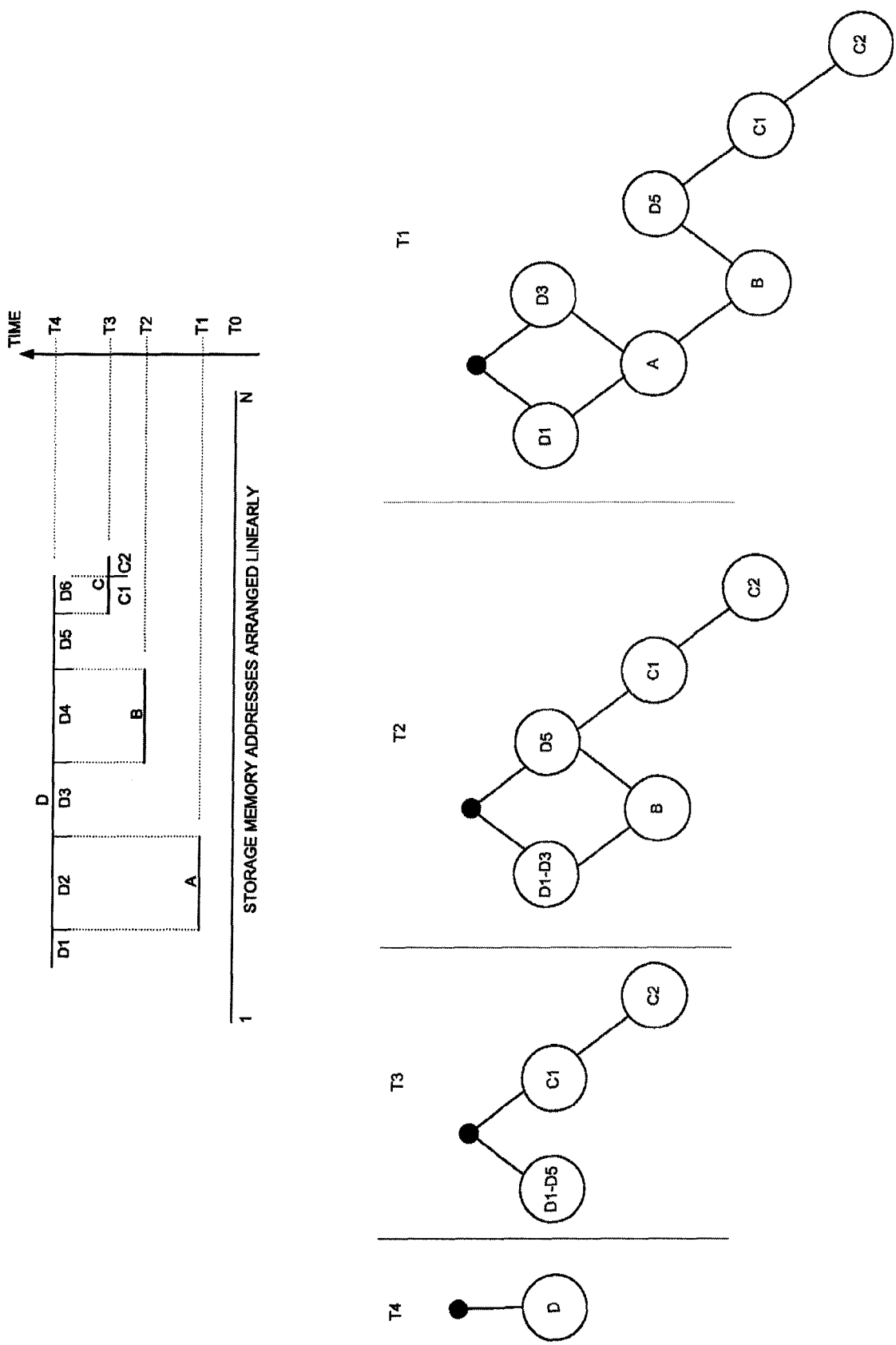
FIG. 6 is an illustration of a binary tree data structure for providing a virtual interface to data that was stored in a storage at a previous time, in accordance with an exemplary embodiment of the present invention.

Specifically, reference is now made to FIG. 6, which is a simplified illustration of a binary tree data structure for providing a virtual interface to data that was stored in storage system 140 at a previous time, in accordance with an exemplary embodiment of the present invention. Shown in FIG. 6 is a simplified representation of memory addresses in storage system 140 arranged linearly in a sequence from 1 to N. Each write transaction in the journal history includes a plurality of designated memory addresses in which to replace old data with new data. Shown in FIG. 6 are four such pluralities, corresponding to write transactions of the forms indicated in TABLE II hereinbelow.

TABLE II

Sample Write Transactions

ID = 1; Time T1; Write DATA_A into an interval, A, of memory locations.
ID = 2; Time T2; Write DATA_B into an interval, B, of memory locations.
ID = 3; Time T3; Write DATA_C into an interval, C, of memory locations.
ID = 4; Time T4: Write DATA_D into an interval, D, of memory locations.

The first transaction, with ID=1, writes DATA_A into interval A of memory locations shown in FIG. 6 at time T1, thereby overwriting data that was previously stored in interval A of storage system 140 at time T0. Similarly, the second transaction, with ID=2, writes DATA_B into interval B, at a later time T2, thereby overwriting data that was previously stored in interval B of storage system 140 at time T0; and the third transaction, with ID=3, writes DATA_C into interval C, at a later time T3, thereby overwriting data that was previously stored in interval C of storage system 140 at time T0. The fourth transaction, with ID=4, writes DATA_D into interval D, at a later time T4. It is noted that interval D overlaps with intervals A, B and C. Specifically, interval D is shown in FIG. 6 as being partitioned into non-overlapping subintervals D1-D6. The data written into subintervals D1, D3 and D5 overwrites the data that was previously stored in these subintervals of storage 140 at time T0. However, the data written into subinterval D2, which is the same as interval A, overwrites DATA_A, which was written into subinterval A at time T1. Similarly, the data written into subinterval D4, which is the same as interval B, overwrites DATA_B, which was written into subinterval B at time T2. The data written into subinterval D6, which is a subset of interval C, overwrites a portion of DATA_C; namely, the portion written into subinterval C1.

In an exemplary embodiment of the present invention, the journal entries in TABLE II are processed in reverse chronological order; i.e., from ID=4 to ID=1. Such order corresponds to a last-in-first-out order, since the journal entries were written in order from ID=1 to ID=4. As shown in FIG. 6, when each successive journal entry from ID=4 to ID=1 is processed, one or more nodes are added to successive binary trees. The binary tree at time T4 consists of a single root node, and a single node underneath the root that records the interval D, and the location in journal history 200 of DATA_D. The next binary tree, at time T3, includes additional nodes for C1 and C2; and the node recording interval D has been changed to record the interval D1-D5. Again, in addition to recording the intervals, the nodes of the binary tree also record the location in journal history 200 of the data corresponding to the intervals.

At time T2 the binary tree the interval D1-D5 is broken down into intervals D1 -D3, D4 and D5, and two additional nodes are appended to the binary tree. Finally, at time T2, the interval D1-D3 is broken down into intervals D1, D2 and D3, and two additional nodes are appended to the binary tree, thereby generating the rightmost binary tree shown at the bottom of FIG. 6.

The binary tree structure thus generated provides, at a time such as T4, indirect access to the data that was in storage system 140 at an earlier time T1. For a given memory address, the binary tree is traversed to find an interval containing the given address. If such interval is located in a node of the binary tree, then the node also provides the location in journal history where the data can be extracted. Otherwise, if such interval is not located, then the data can be extracted from the latest state of the storage at time T4.

A disadvantage of the binary tree data structure is that storage of the binary tree requires a large amount of memory with the DPA 170, and may exceed the DPA memory capacity. In a second embodiment of the present invention, which generally requires less DPA memory, the data structure generated at step 530 includes one or more sorted lists, each list storing data from write transactions in journal history 200, as described in detail hereinbelow.

Figure 7:
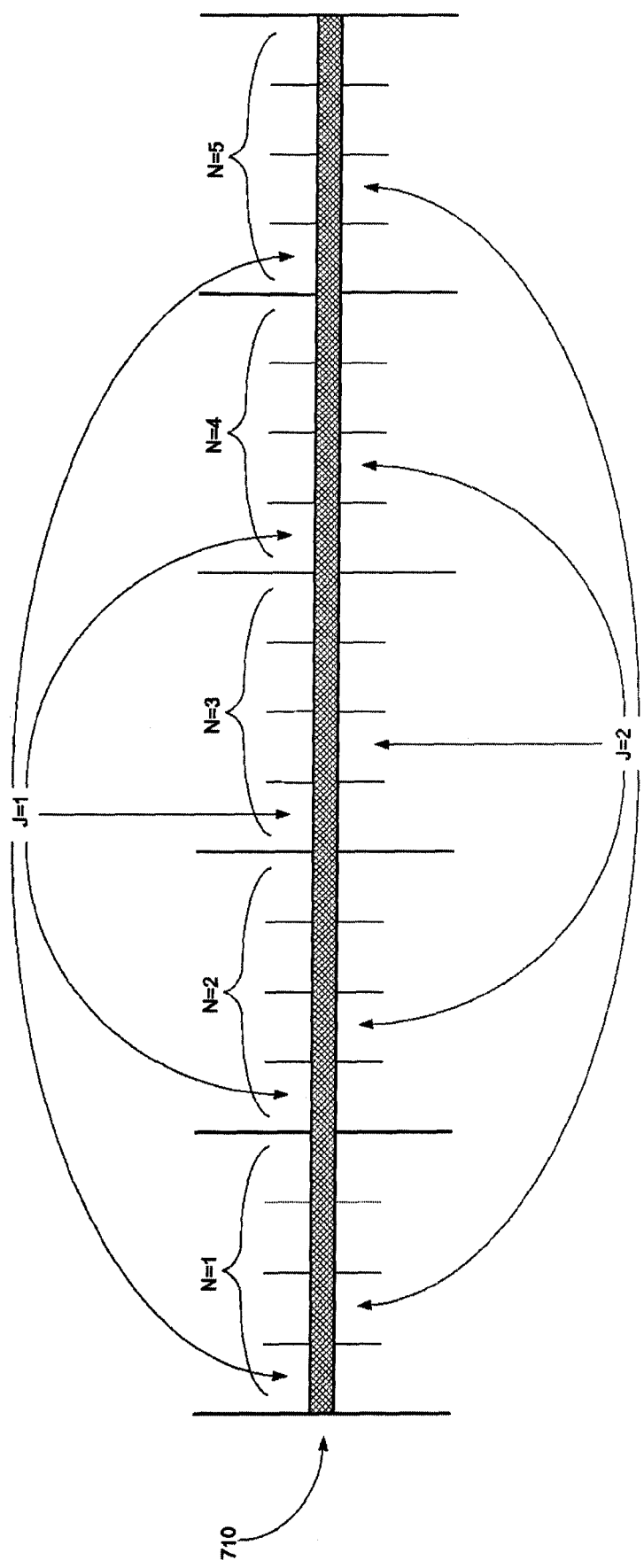
FIG. 7 is an illustration of a sorted list data structure for providing a virtual interface to data that was stored in a storage at a previous time, in accordance with an exemplary embodiment of the present invention.

Reference is now made to FIG. 7, which is a simplified illustration of a sorted list data structure for providing a virtual interface to data that was stored in a storage at a previous time, in accordance with an exemplary embodiment of the present invention. Shown in FIG. 7 is a representation of memory addresses in storage system 140 as a linear sequence 710. The memory addresses are partitioned into interval bins designated by N=1, N=2, etc. FIG. 7 illustrates a setup with five such bins. For example, if linear sequence 710 includes 1 TB of memory, then each bin spans 200 GB. In turn, each bin is further partitioned into sub-bins. FIG. 7 illustrates a setup with four sub-bins per bin, each sub-bin spanning 50 GB. For example, the number of bins may be on the order of 100, and the number of sub-bins may be on the order of 100 sub-bins per bin. However, for the sake of clarity, FIG. 7 illustrates a setup with fewer bins and sub-bins.

In accordance with an exemplary embodiment of the present invention, an instant recovery request with a specified point in time triggers generation of ordered lists, as follows. The UNDO METADATA stream is parsed and binned appropriately according to data volume location. For each bin, a binary tree structure of non-overlapping intervals located within the bin, and ordered by beginning storage address, is generated as described hereinabove with respect to FIG. 6; and the binary tree entries are stored within the bin.

The various corresponding sub-bins of each bin are grouped together into ordered lists, designated by J=1, J=2, etc., as illustrated in FIG. 6 for J=1 and J=2. The ordered list for J=1 includes the pluralities of memory addresses associated with write transactions subsequent to time T1, that store new data into memory addresses located within the sub-bins associated with J=1. The entries in the list, namely, the various pluralities of memory addresses, are sorted in linear order based on the lowest addresses therein. For example, using the sizes as above, the 10 K blocks of memory starting at addresses 24 G, 213 G, 448 G, 601 G and 836 G would each be stored in the J=1 list; and the 10 K blocks of memory starting at addresses 174 G, 361 G and 589 G would each be stored in the J=4 list.

The data within the bins may require a lot of memory for storage. To this end, the ordered lists themselves are stored within storage system 140, arranged, for example, as binary tree structures; and a filtered sub-list is stored in memory of DPA 170, the filtered sub-list including only every $M^{th}$ entry from the full list. For example, if M=1000, then each $100^{th}$ entry in a full list is stored in the sub-list. Alternatively, the filtered sub-list may include only one entry from each GB of storage locations.

The sorted lists and sub-lists thus generated provide a virtual interface to the data that was stored in storage system 140 at time T1. Given a specific memory address, the appropriate sub-bin is readily identified. The entries of the corresponding sub-list are searched to identify two bounding addresses, one below and one above the specific memory address. The two entries in the sub-list can include pointers to positions in the full lists that they correspond to and, using these pointers, a search is made of the full list between the two pointers. For example, suppose the specified memory address is 24 G+178 M+223 K+66. Then the relevant sub-list is J=1. Suppose further that the entries 24 G+13 M and 32 G+879 M are located in the sub-list for J=1 at locations corresponding to locations 122,001 and 123,000 in the full list for J=1. Then the full sorted list can be searched over the 1,000 entries between 122,001 and 123,000 to locate an entry that contains the specified memory address 24 G+178 M+223 K+66. If such an entry is located, then the UNDO data from the corresponding write transaction is the sought after data. Otherwise, if such an entry is not located, then the data currently in storage system 140 is the sought after data.

It may be appreciated that the advantage of combining sub-bins in a cyclical arrangement, as illustrated in FIG. 7, is that often write transactions are concentrated about small portions of memory. During data processing it is common for I/O requests to be clustered around a relatively small portion of storage, referred to as a "hot spot". Using cyclically arranged sub-bins often results in such write transactions being confined within relatively small intervals within the lists, thus making it easier to search through them. In distinction, using consecutive sub-bins would result in such transactions being confined within large intervals, making it more difficult to search through them.

Occurrence of "hot spots" poses an additional challenge of sorting. Specifically, when a lot of data is allocated to a single bin, as is the case with "hot spots", the RAM required to sort such data may not be available within the DPA, since the RAM within the DPA may not be large enough to load all of the data stored on disk. According to an exemplary embodiment of the present invention, the disk is used to sort such data. Instead of loading all of the data within a bin into RAM, the bin is divided into sub-areas according to time. For example, the bin may be divided into sub-areas corresponding to one million write transactions. Data from each sub-area is loaded into RAM, sorted, and written back into the bin. Such sorting of a plurality of sub-areas of the bin generates a corresponding plurality of sub-lists, the lists themselves being sorted according to time. Finally, the sub-lists are merged into an aggregate sorted list, according to any well-known merge algorithms.

The first and second embodiments, illustrated in FIGS. 6 and 7 respectively, and described hereinabove, are triggered by a user request for access to data from an earlier point in time. In a third embodiment, a data structure is automatically generated in background during normal course of production operation. Whenever data is written to a data volume and UNDO data is recorded in a journal history, the UNDO data is also buffered in memory. When the buffer is full, the buffer entries are sorted by storage address into a sorted list, and the sorted list is written to the journal volume. In one embodiment, the sorted list is arranged according to a binary tree structure. Alternatively, the sorted list may be arranged in sequential order. The sorted lists, themselves, are chronologically ordered according to the times that data was written to the data volume. Subsequently, when a user requests recovery to a previous point in time, the sorted lists are merged.

It may be appreciated that the data structures shown in FIGS. 6 and 7 may be used to access data that was stored in storage system 140 at an earlier point in time, T1. In certain circumstances it may be desired to rollback storage system 140 to time T1; in other circumstances it may only be desired to access data from T1, without a storage rollback.

In an exemplary embodiment of the present invention, the data structures shown in FIGS. 6 and 7 are used for source side data recovery; i.e., for recovering data that was in target storage system 140 at time T1, in situations where the data in source side storage system 120 became corrupt afterwards. Source side storage system 120 may have become corrupt due to a disaster at the physical site housing storage system 120, or due to a computer virus, or due to human error. Whatever the cause of the disaster, the data recovery system of the present invention may be used to restore storage system 120 to the state it was in at time T1, prior to the disaster.

Referring back to FIG. 5, at step 540 a user processes data from a previous point in time, using the virtual interface and the journal history, as described hereinabove with reference to FIGS. 6 and 7. Simultaneously while the user is processing data from the previous point in time using the virtual interface, at step 550 a full rollback of the storage system is performed in parallel. At step 560 an auxiliary journal history of write transactions is recorded, reflecting the I/O requests originating from the user's data processing at step 540. At step 570, in parallel with step 560, the storage system is updated by applying write transactions recorded in the auxiliary journal history. Finally, at step 580 a seamless switch is made from the virtual interface to a direct interface for accessing the storage system. Accomplishing such a seamless switch involves connections between logical units and physical storage, and is described in detail with respect to FIGS. 8A-8E hereinbelow.

In general, a storage area network (SAN) includes one or more devices, referred to as "nodes". A node in a SAN may be an "initiator" or a "target", or both. An initiator is a device is able to initiate requests to one or more other devices; and a target is a device that is able to reply to requests, such as SCSI commands, sent by an initiator. Typically, physical storage systems, like systems 120 and 140 of FIG. 1, are targets.

A physical storage system may store data in a variety of physical devices, such as disks, or arrays of disks. A physical storage systems typically includes a controller, which has its own one or more processors and memory, and which manages storage of data. In order to enable initiators to send requests to a physical storage system, the controller exposes one or more logical units to which commands are issued. A logical units is identified by a logical unit number (LUN). Generally, a host computer operating system creates a device for each LUN.

Figure 8A:
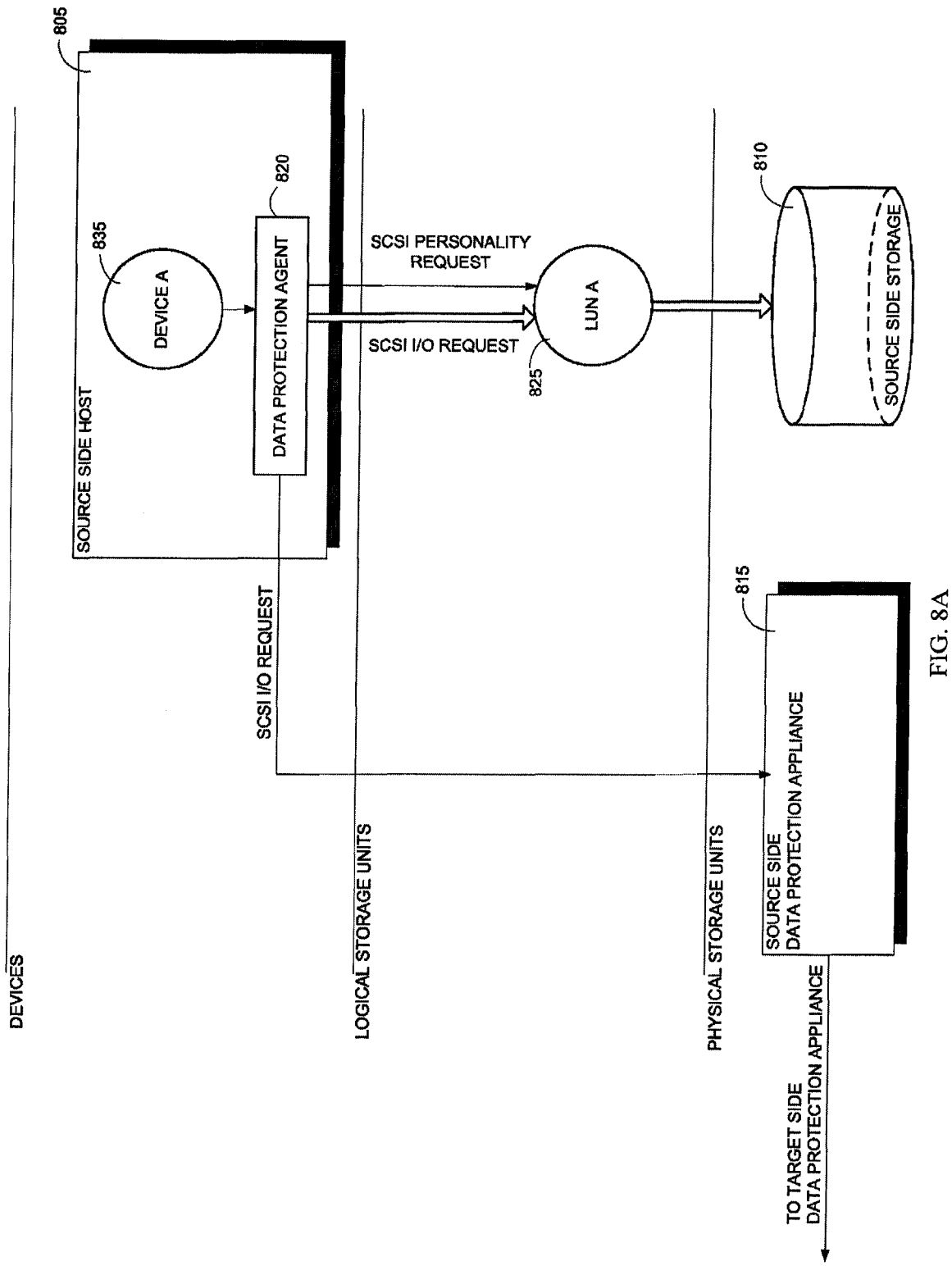
FIG. 8A is an illustration of a system production mode at a source side production site, in accordance with an exemplary embodiment of the present invention.

Reference is now made to FIG. 8A, which illustrates a normal system production mode at a source side production site, in which I/O requests are made to a storage system, and replicates of the requests are send to a data protection appliance for maintaining a duplicate storage system at a target side, in accordance with an exemplary embodiment of the present invention. Shown in FIG. 8A are a host computer 805, a physical storage system 810, and a DPA 815. Host computer 805 includes a data protection agent 820.

In an exemplary embodiment of the present invention, host computer 805 is an initiator that sends requests to storage system 810 using the small computer system interface (SCSI). Host computer 805 has access to a device 825, as Device A, which is associated with a logical unit number (LUN) 825, designated as LUN A. In accordance with an exemplary embodiment of the present invention, DPA 815 functions as a target; i.e., it can reply to SCSI commands sent to it by initiators in the SAN. DPA 815 is also an initiator, and may send SCSI commands to storage system 810.

During normal production, host computer 805 issues read and write requests, such as SCSI I/O requests, to LUN A. Data protection agent 820 is able to intercept SCSI commands issued by host computer 805 through Device A. In accordance with an exemplary embodiment of the present invention, data protection agent 820 may act on a SCSI command issued to Device A in one of the following ways:

Send the SCSI command to its intended LUN.
Redirect the SCSI command to another LUN. or
Split the SCSI command by sending it first to DPA 815.
  After DPA returns an acknowledgement to host computer 805, send the SCSI command to its intended LUN. Alternatively, data protection agent 820 may also fail or delay a SCSI command, by not returning an acknowledgement to host computer 805.

The communication between data protection agent 820 and DPA 815 may be any protocol suitable for data transfer in a SAN, such as fiber channel, or SCSI over fiber channel. The communication may be direct, or through a LUN exposed by DPA 815, referred to as a "communication LUN". In an exemplary embodiment of the present invention, data protection agent 820 communicates with DPA 815 by sending SCSI commands over fiber channel.

In an exemplary embodiment of the present invention, data protection agent 820 is a driver located in host computer 805.

It may be appreciated that data protection agent 820 may also be located on a fiber channel switch, or in any other device situated in a data path between host computer 805 and storage system 810.

In an exemplary embodiment of the present invention, data protection agent 820 classifies SCSI requests in two broad categories; namely, "SCSI personality" queries, and SCSI I/O requests. SCSI I/O requests are typically read and write commands. SCSI personality queries are SCSI commands send to inquire about a device. Typically, when host computer 805 detects a fiber channel SCSI device, it sends these personality queries in order to identify the device. Examples of such queries include:

STANDARD INQUIRY—for requesting the vendor and product name of the SCSI device, its type (disk, tape), and other attributes.
READ CAPACITY—for requesting the block size and number of blocks for the SCSI device.
UNIT SERIAL NUMBER—for requesting the serial number of the SCSI device In accordance with an exemplary embodiment of the present invention, source side data protection agent 820 is configured to act as a splitter. Specifically, data protection agent 820 routes SCSI personality requests directly to LUN A, and replicates SCSI I/O requests. A replicated SCSI I/O request is sent to DPA 815 and, after receiving an acknowledgement from DPA 815, data protection agent 820 sends the SCSI I/O request to LUN A exposed by storage system 810. Only after receiving a second acknowledgement from storage system 810 will host computer 805 initiate another I/O request. The I/O request path from data protection drive 820 to storage system 810 is indicated by wider arrows in FIG. 8A.

When DPA 815 receives a SCSI write request from data protection agent 820, DPA 815 transmits I/O information to a corresponding DPA on the target side, for journaling.

Figure 8B:
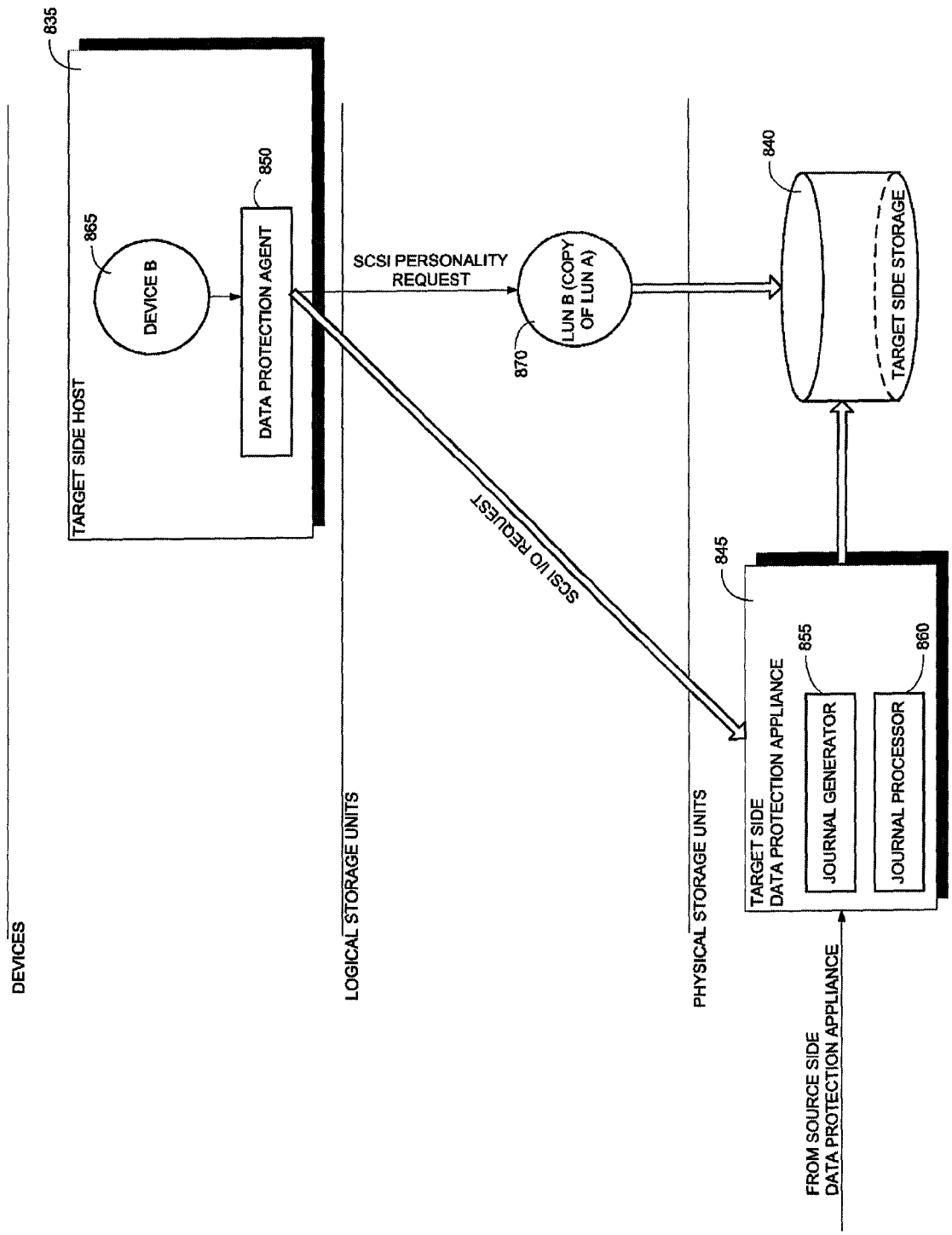
FIG. 8B is an illustration of a system data replication mode at a target side, in accordance with an exemplary embodiment of the present invention.

Reference is now made to FIG. 8B, which is a simplified illustration of a system data replication mode at a target side, in which I/O requests received from a source side are entered into a journal history on the target side, and applied to a target storage system, in accordance with an exemplary embodiment of the present invention. Shown in FIG. 8B are a host computer 835, a physical storage system 840 and a DPA 845. Host computer 835 includes a data protection agent 850. DPA 845 includes a journal generator 855 and a journal processor 860, the functionalities of which are described hereinabove with reference to FIG. 3.

Host computer 835 includes a host device 865, designated as Device B, having a corresponding LUN 870, designated as LUN B, which is a target LUN.

In accordance with an exemplary embodiment of the present invention, LUN B is a copy of source side LUN A of FIG. 8A. During normal course of operation, DPA 845 receives replicated data of LUN A from DPA 815, as shown in FIG. 8A, and performs journaling and subsequent application to storage system 840, as described hereinabove. When applying write operations to storage system 840, DPA 845 acts as an initiator, and sends SCSI commands to LUN B. In order to prevent other I/O requests from being sent from host computer 835 to LUN B, data protection agent 850 fails I/O requests sent by host computer 835 to LUN B. When in recovery mode, however, data protection agent 850 stops failing SCSI personality requests and starts sending them directly to LUN B. Additionally, data protection agent 850 stops failing I/O requests and starts sending them to DPA 845 or to storage system 840 as described in detail hereinbelow.

During a recovery rollback, write transactions in journal history 200 are undone, so as to restore storage system 840 to the state it was at, at an earlier time T1. Generally, it takes a long time to perform a full rollback of storage system 840. In the meantime, DPA 845 generates a virtual image of storage system 840, and then instructs data protector driver 850 to redirect SCSI I/O commands to DPA 845. SCSI personality commands are still directed to LUN B.

Thus while such rollback is occurring, DPA 845 has indirect access to the time T1 data via the data structures illustrated in FIGS. 6 and 7. As described hereinabove with reference to FIG. 3, these data structures are generated by journal processor 860. In order to enable indirect access to the virtual image of LUN B on DPA 845, data protection agent 850 redirects SCSI read requests to DPA 845. Host computer 835 is thus able to access and process the time T1 data before the full rollback operation is complete.

In addition to redirecting SCSI read requests, data protection agent 850 also redirects SCSI write requests to DPA 845. As host computer 835 processes the rolled back data via DPA 845, an auxiliary journal history is maintained, for recording write transactions applied to the time T1 data, as illustrated in FIG. 4 hereinabove. Redirection of SCSI write requests ensures that write transactions are not applied to LUN B before a rollback is complete. As described in detail hereinabove with reference to FIG. 4, an auxiliary journal history of such write transactions may be applied to LUN B only after storage system 840 has been restored to its earlier state at time T1.

After restoring storage system 840 to its earlier state at time T1, and after applying the write transactions maintained in the auxiliary journal history, LUN B may start receiving I/O requests directly. Using the capabilities of data protection agent 850, as described hereinabove with respect to driver 820 of FIG. 8A, a seamless transition can occur between the virtual interface provided by DPA 845 and physical storage system 840, without interruption of data processing. In an exemplary embodiment, the seamless transition is accomplished by stopping redirecting of I/O requests issued by host computer 835 to LUN B, to DPA 845, and starting sending such requests directly to LUN B.

It may be appreciated that the architecture of FIG. 8B enables rollback to a multiplicity of previous points in time. For rollback to single point in time, it suffices to use a single LUN. For rollback to multiple points in time, additional LUNs are created, so as to generate additional devices in the host. Creation of additional LUNs may be performed by a user, or by a DPA. In an exemplary embodiment of the present invention, the DPA creates small additional LUNs, which serve to provide device "personalities" as described hereinabove; and the DPA uses a physical LUN for storage rollback. One embodiment provides user access to multiple points in time, while simultaneously rolling back storage system 840.

Figure 8C:
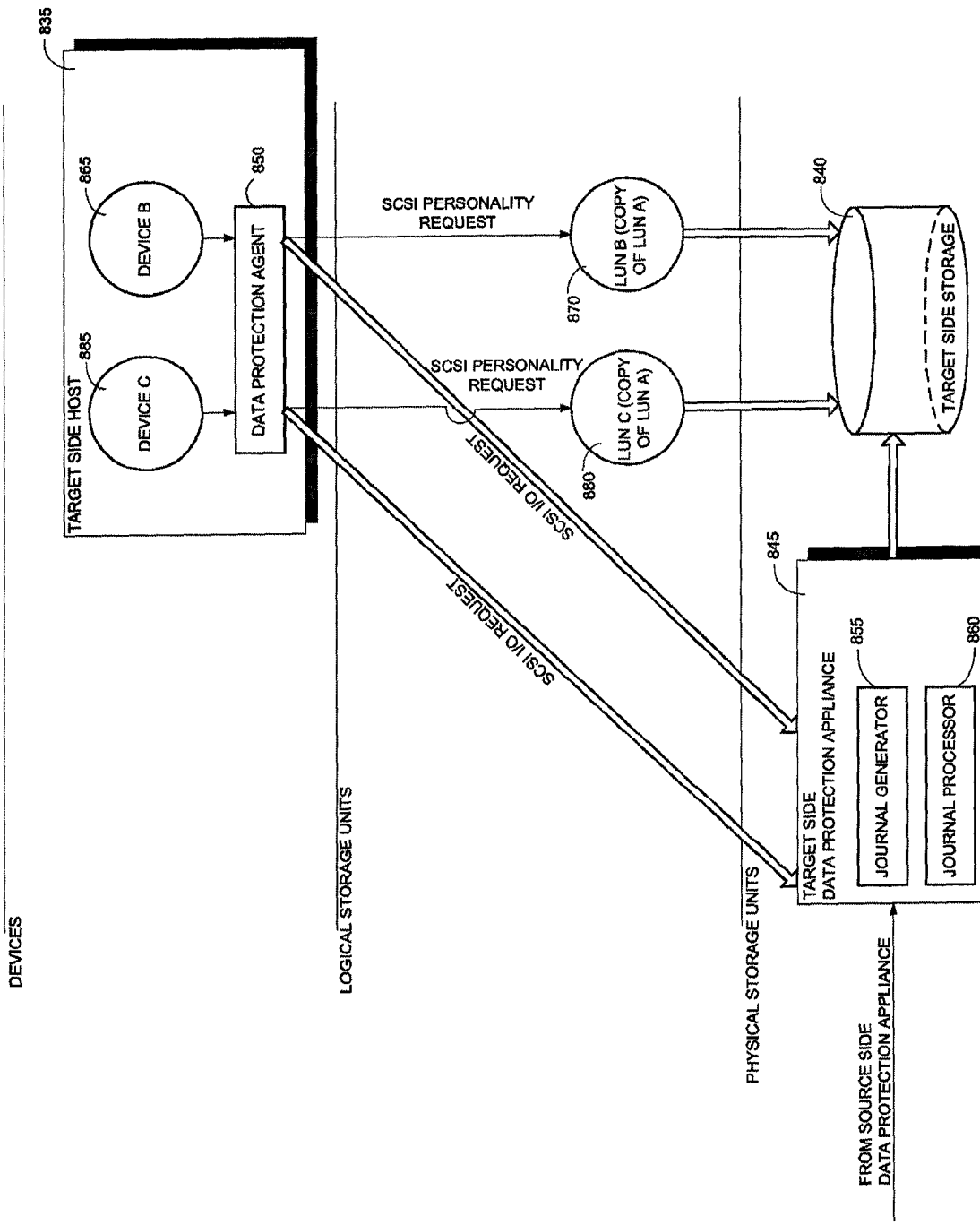
FIG. 8C is an illustration of a first embodiment of a system for accessing data from two earlier points in time, wherein a storage system controller generates an appropriate additional LUN.

Reference is now made to FIG. 8C, which is a simplified illustration of a first embodiment of a system for accessing data from two earlier points in time, T1 and T2, wherein a storage system controller generates an appropriate additional LUN. Shown in FIG. 8C is a configuration whereby target side storage system 840, through its controller, exposes an addition LUN, designated as LUN C 880. In one embodiment, LUN C, being a second target LUN for source side LUN A from FIG. 8A, is a copy of LUN A. Host computer 835 recognizes LUN C, and generates a correspondence device, Device C, designated as 885. In one embodiment, Device C is another image of LUN A. During normal course of operation and during recovery and rollback, Device C is handled by DPA 845 and by data protection agent 850 as described regarding Device B in FIG. 8B. In particular, during normal course of operation, when DPA receives replicated data, it journals the request and applies the write for both LUN B and LUN C.

DPA 845 can also include an appropriate data structure for accessing time T1 data, and an appropriate data structure for accessing time T2 data during a rollback and recovery process. As such, host computer 835 is able to access time T1 data using Device B, and to access time T2 data using Device C. Data protection agent 850 handles Device B and Device C in the same way.

Figure 8D:
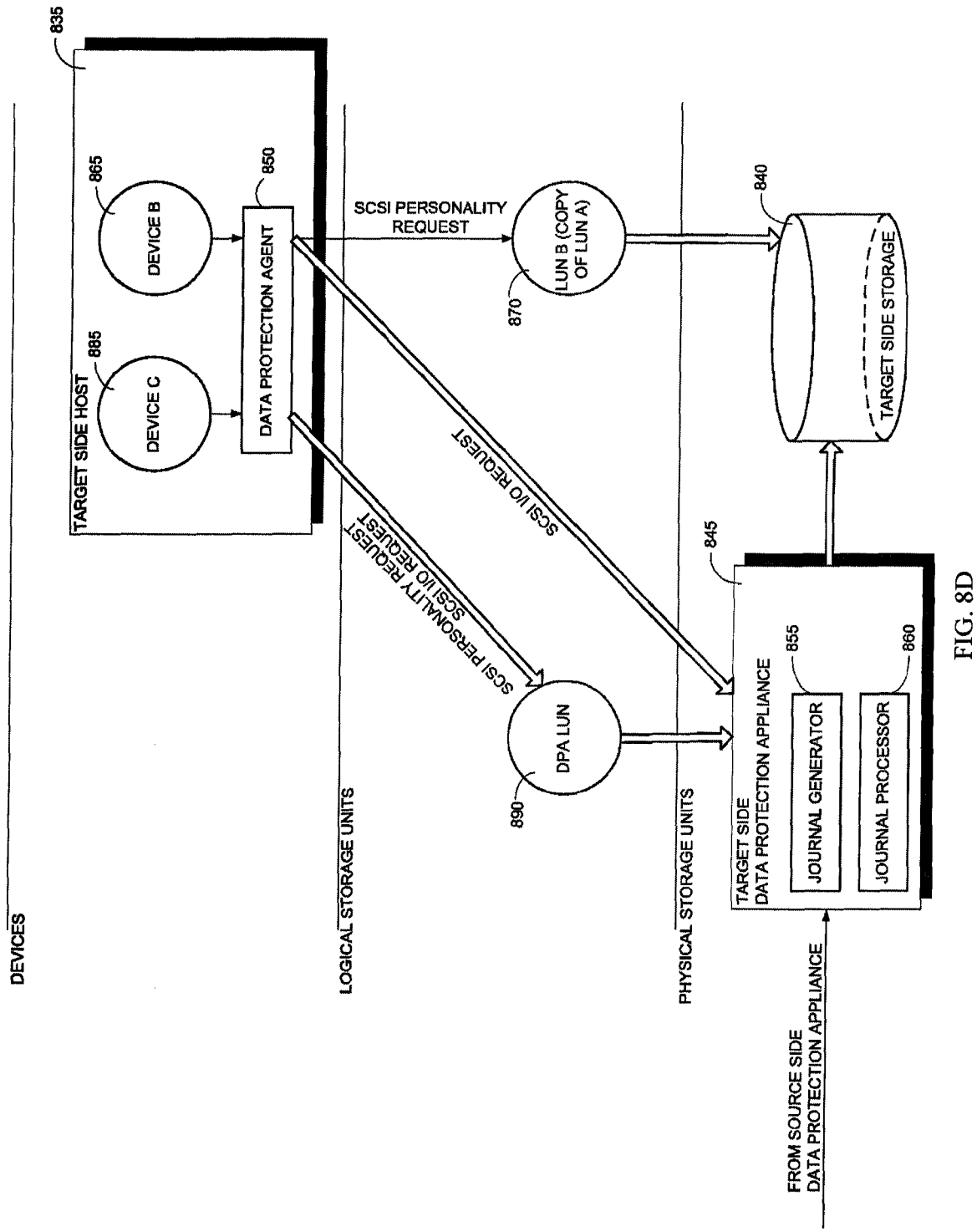
FIG. 8D is an illustration of a second embodiment of a system for accessing data from two earlier points in time, wherein a data protection appliance generates an appropriate additional LUN in response to a trigger for data recovery, in accordance with an exemplary embodiment of the present invention.

The embodiment in FIG. 8C uses two existing copies of LUN A, both having the same size as LUN A and both generated by storage system 840. In another embodiment, LUN C may be generated by DPA 845 in response to a trigger for recovery and rollback, as illustrated in FIG. 8D. FIG. 8D is a simplified illustration of a second embodiment of a system for accessing data from two earlier points in time, T1 and T2, wherein a data protection appliance generates an appropriate additional LUN in response to a trigger for data recovery.

As shown in FIG. 8D, when a user wants to recover two points in time, T1 and T2, LUN B is used for recovering to time T1. Additionally, DPA 845 generates an additional LUN; namely, DPA LUN 890, corresponding to time T2. In accordance with an exemplary embodiment of the present invention, DPA LUN 890 may be created with its own personality or with a personality that is identical, or substantially identical to that of LUN B.

Host computer 835 recognizes DPA LUN 890 and generates a corresponding Device C, designated as 885. Since LUN 890 is a DPA LUN, data protection agent 850 routes all SCSI requests from Device C to DPA 845, including SCSI personality requests, as it is not necessary to handle SCSI personality requests differently than SCSI I/O requests in this configuration.

Unlike the configuration of FIG. 8C, in FIG. 8D LUN 890 is only used as an interface to the virtual image of LUN A created by DPA 845, and is only exposed during a recovery process. Thus, LUN 890 is virtual and does not consume any physical storage. As such, the configuration of FIG. 8D is well suited for recovery to multiple points in time simultaneously. However, since LUN 890 is not a physical image, it cannot be rolled back to an earlier state. Thus while a user is able to access and process data from multiple points in time, physical rollback can only be performed to one point in time.

Figure 8E:
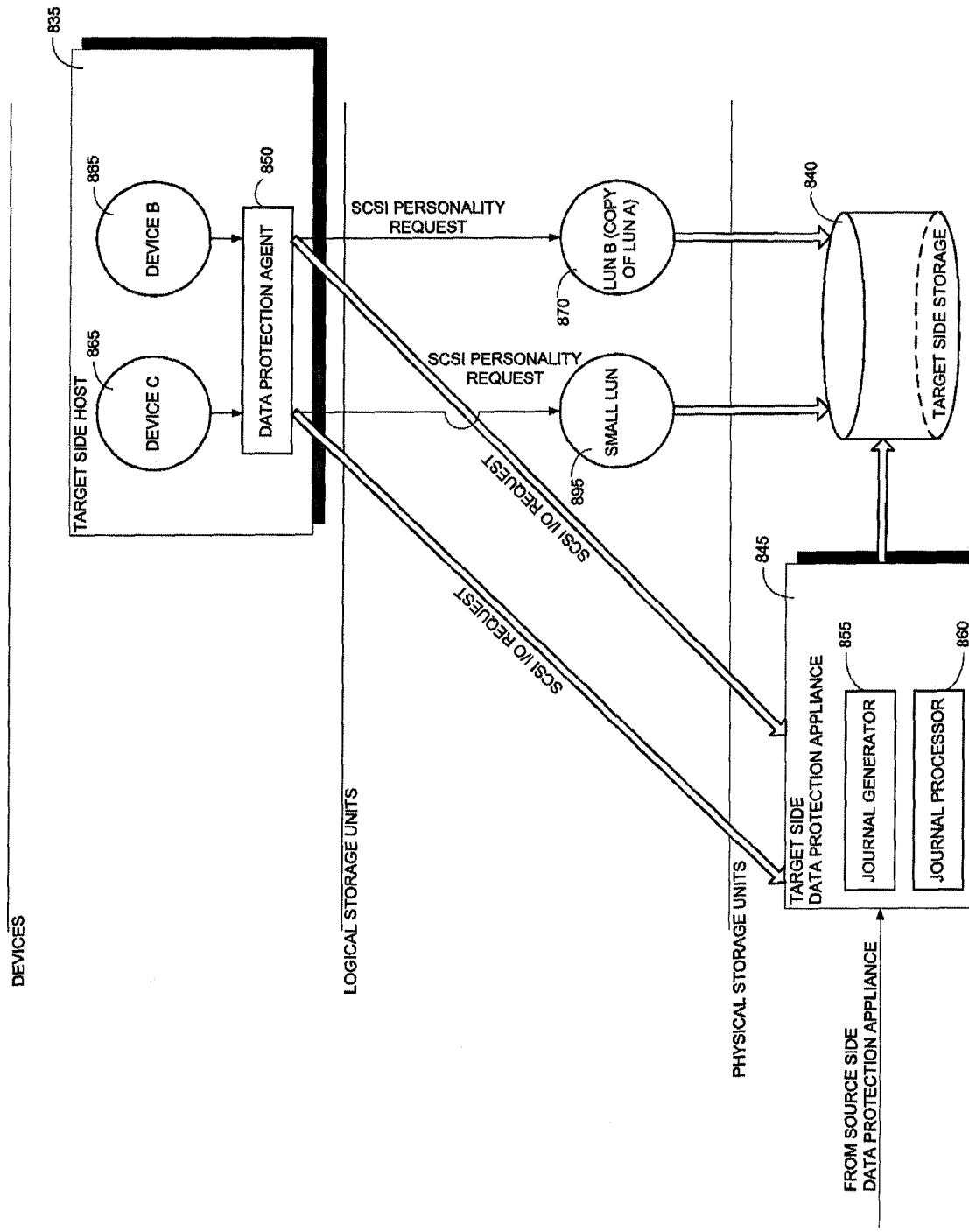
FIG. 8E is an illustration of a third embodiment of a system for accessing data from two earlier points in time, wherein a storage system generates an appropriate additional LUN in response to a trigger for data recovery.

In yet another embodiment, LUN C may be generated by storage system 840 in response to a recovery process, as illustrated in FIG. 8E, which is a simplified illustration of a third embodiment of a system for accessing data from two earlier points in time, T1 and T2, wherein storage system 840 is configured by a user to have an appropriate additional LUN, for use in response to a trigger for data recovery. In one embodiment, storage system 840 is configured to generate a small LUN, designated as 895, and a corresponding Device C, designated as 885. In this configuration data protection drive 850 routes SCSI personality requests from Devices B and C to their corresponding LUNs, and routes SCSI I/O requests to DPA 845. SCSI requests regarding size of LUN 895 are also redirected to DPA 845.

Figure 8F:
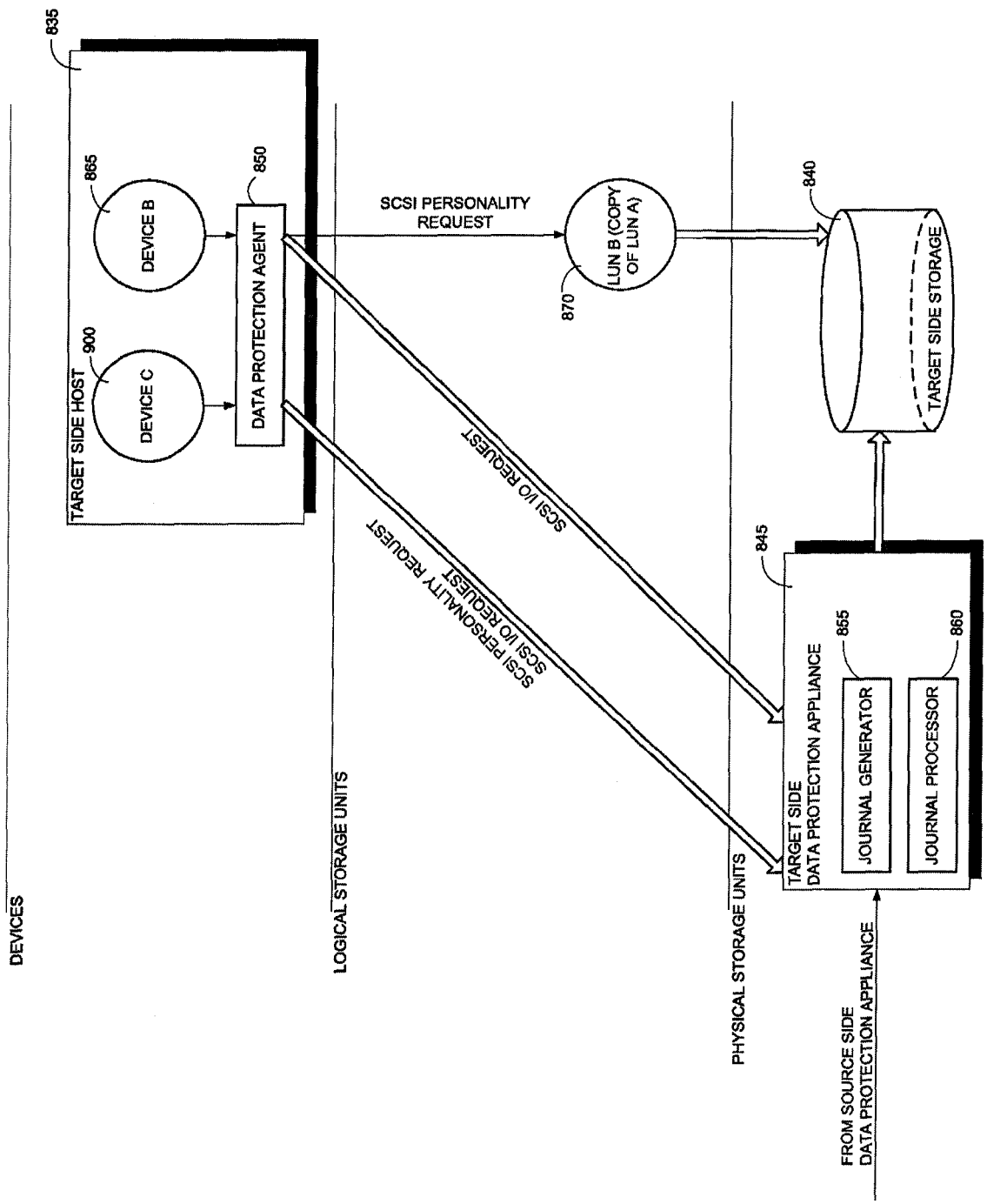
FIG. 8F is an illustration of a fourth embodiment of a system for accessing data from two earlier points in time, wherein a data protection agent generates an appropriate additional LUN in response to a trigger for data recovery.

In yet another alternative embodiment, LUN C may be generated by data protection agent 850 in response to a trigger for data recovery. Reference is now made to FIG. 8F, which is a simplified illustration of a fourth embodiment of a system for accessing data from two earlier points in time, T1 and T2, wherein a data protection agent generates an appropriate additional LUN in response to a trigger for data recovery. As shown in FIG. 8F, data protection agent 850 creates an additional "pseudo" device C, designated as 900, in response to a trigger for data recovery. Typically, operating systems provide an interface that allows kernel mode drivers to create pseudo devices on a host. Such a driver is responsible for handling both personality and I/O SCSI commands issued to these devices. In the configuration of FIG. 8F, data protection agent 850 routes all SCSI commands to DPA 845.

Thus it may be appreciated that the additional LUN, corresponding to time T2, may be generated by a controller for storage system 840 as in FIG. 8C or FIG. 8E, or by DPA 845 as in FIG. 8D, or by data protection agent 850 as in FIG. 8F. LUNs generated by DPA 845 or by data protection agent 850, or small LUNs generated by storage system 840 cannot be rolled back physically. In an exemplary embodiment of the present invention, DPA 845 uses both an additional small LUN for time T1 and the physical image corresponding to time T2, or vice versa. As such, DPA 845 may perform a physical rollback to time T2 while host computer 840 is accessing data from times T1 and T2 simultaneously.

Having read the above disclosure, it will be appreciated by those skilled in the art that the present invention can be used to provide access to historical data within a wide variety of systems. Although the invention has been described with reference to a data recovery system that includes source side and target side storage systems, the present invention applies to general data management systems that may required "go back" access to data that was processed at an earlier point in time.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for providing access to data, comprising:
   for a host device within a host computer, the host device corresponding to a first logical storage unit configured to access data directly from a physical storage system, assigning a second logical storage unit configured to access the storage system indirectly via a data protection computer;
   providing the data protection computer access to a data structure that is able to recover data that was stored in the storage system at an earlier point in time; and
   in response to a request from the host computer for data that was stored in the storage system at the earlier point in time, switching the host device to get its data from the second logical storage unit instead of from the first logical storage unit.

2. The method of claim 1 wherein said assigning is automatically performed by the host computer.

3. The method of claim 1 wherein said assigning is automatically performed by the data protection computer.

4. The method of claim 1 wherein said assigning is performed by a controller of the storage system.

5. The method of claim 1 further comprising:
   rolling back the storage system to an earlier point in time; and
   after completion of said rolling, switching the first device to get its data from the first logical storage unit instead of from the second logical storage unit.

6. The method of claim 1 wherein the data structure that is able to recover data that was stored in the storage system at an earlier point in time is also able to recover data that was stored in the storage system at a second earlier point in time, the method further comprising:
   defining a second host device, corresponding to a further logical storage unit that is similar to the first logical storage unit; and
   in response to a request from the host computer for data that was stored in the storage system at the second earlier point in time, switching the second host device to get its data from the second logical storage unit instead of from the further logical storage unit.

7. A data access system, comprising:
   a physical storage system;
   a data protection computer for accessing a data structure that is able to recover data that was stored in said storage system at an earlier point in time (T1); and
   a host computer connected with said storage system, comprising:
      a host device (Device A) corresponding to a first logical storage unit (LUN A) configured to access data directly from said storage system; and
      a host driver for assigning a second logical storage unit (LUN X) to the host device (Device A), wherein the second logical storage unit (LUN X) is configured to access said storage system indirectly via said data protection computer, and for switching the host device (Device A) to get its data from the second logical storage unit (LUN X) instead of from the first logical storage unit (LUN A) in response to a request from said host computer for data that was stored in said storage system at the earlier point in time (T1).

8. The data access system of claim 7 further comprising a data recovery processor for rolling back the storage system to the earlier point in time (T1), and wherein said host driver switches the host device (Device A) to get its data from the first logical storage unit (LUN A) instead of from the second logical storage unit (LUN X), after completion of rollback by said data recovery processor.

9. The data access system of claim 7 wherein the data structure that is able to recover data that was stored in said storage system at the earlier point in time (T1) is also able to recover data that was stored in the storage system at a second earlier point in time (T2), and wherein said host driver is also operable for defining a second host device (Device B) corresponding to a further logical storage unit (LUN B), and for switching the second host device (Device B) to get its data from the second logical storage unit (LUN X) instead of from the further logical storage unit (LUN B), in response to a request from the host computer for data that was stored in the storage system at the second earlier point in time (T2).

10. A computer-readable storage medium storing program code for causing a host computer that comprises a host device designated as Device A and corresponding to a first logical storage unit designated as LUN A, where LUN A is configured to access data directly from a storage system:
   to assign a second logical storage unit, designated as LUN X, wherein LUN X is configured to access the storage system indirectly via a data protection computer;
   to provide the data protection computer access to a data structure that is able to recover data that was stored in the storage system at an earlier point in time, T1; and
   to switch Device A to get its data from LUN X instead of from LUN A, in response to a request from the host computer for data that was stored in the storage system at time T1.

11. The storage medium of claim 10, wherein said assigning is automatically performed by the host computer.

12. The storage medium of claim 10, wherein said assigning is automatically performed by the data protection computer.

13. The storage medium of claim 10 wherein said assigning is performed by a controller of the storage system.

14. The storage medium of claim 10, further comprising:
rolling back the storage system to an earlier point in time; and
after completion of said rolling, switching the first device to get its data from the first logical storage unit instead of from the second logical storage unit.

15. The storage medium of claim 10 wherein the data structure that is able to recover data that was stored in the storage system at an earlier point in time is also able to recover data that was stored in the storage system at a second earlier point in time, further comprising:
defining a second host device, corresponding to a further logical storage unit that is similar to the first logical storage unit; and
in response to a request from the host computer for data that was stored in the storage system at the second earlier point in time, switching the second host device to get its data from the second logical storage unit instead of from the further logical storage unit.

* * * * *